(12) United States Patent
Sugio et al.

(10) Patent No.: US 10,087,798 B2
(45) Date of Patent: Oct. 2, 2018

(54) OIL SEPARATOR

(71) Applicant: NABTESCO AUTOMOTIVE CORPORATION, Tokyo (JP)

(72) Inventors: Takuya Sugio, Tokyo (JP); Ichiro Minato, Tokyo (JP)

(73) Assignee: NABTESCO AUTOMOTIVE CORPORATION, Tokyo (JP)

(*) Notice: Subject to any disclaimer, the term of this patent is extended or adjusted under 35 U.S.C. 154(b) by 0 days.

(21) Appl. No.: 14/380,810

(22) PCT Filed: Feb. 27, 2013

(86) PCT No.: PCT/JP2013/055188
§ 371 (c)(1),
(2) Date: Aug. 25, 2014

(87) PCT Pub. No.: WO2013/129496
PCT Pub. Date: Sep. 6, 2013

(65) Prior Publication Data
US 2015/0052861 A1 Feb. 26, 2015

(30) Foreign Application Priority Data

Feb. 27, 2012 (JP) .................................. 2012-040584
Jun. 29, 2012 (JP) .................................. 2012-147748
(Continued)

(51) Int. Cl.
*B01D 50/00* (2006.01)
*F01M 13/02* (2006.01)
(Continued)

(52) U.S. Cl.
CPC ............. *F01M 13/02* (2013.01); *B01D 45/02* (2013.01); *B01D 45/04* (2013.01); *B01D 45/08* (2013.01);
(Continued)

(58) Field of Classification Search
CPC ............. F01M 13/02; F01M 2013/045; F01M 2013/0472; F01M 11/08;
(Continued)

(56) References Cited

U.S. PATENT DOCUMENTS 1,621,026 A 3/1927 Pukerud
2,082,863 A 6/1937 Weisgerber
(Continued)

FOREIGN PATENT DOCUMENTS

CN 1248480 A 3/2000
CN 1625649 A 6/2005
(Continued)

OTHER PUBLICATIONS

Translation of Written Opinion for related patent application PCT/JP2013/055188, dated Sep. 2, 2014-2014, pp. 1-13.
(Continued)

*Primary Examiner* — Dung H Bui
(74) *Attorney, Agent, or Firm* — Wolf, Greenfield & Sacks, P.C.

(57) ABSTRACT

An oil separator is provided with a housing having an inlet for air, an expansion chamber provided inside the housing, and a heating device for heating the lower part of the expansion chamber. The oil separator introduces, into the housing, air containing oil that has passed through the inlet, and separates and recovers the oil from the air that has been introduced. The transverse cross-sectional area of the expansion chamber is larger than the opening area of the inlet.

17 Claims, 20 Drawing Sheets

(30) Foreign Application Priority Data

Oct. 31, 2012 (JP) ................ 2012-241234
Feb. 26, 2013 (JP) ................ 2013-036394

(51) Int. Cl.
  *B01D 45/02* (2006.01)
  *B01D 45/08* (2006.01)
  *B01D 45/04* (2006.01)
  *F04B 39/16* (2006.01)
  *F01M 13/04* (2006.01)

(52) U.S. Cl.
  CPC ....... *F04B 39/16* (2013.01); *F01M 2013/045* (2013.01); *F01M 2013/0472* (2013.01)

(58) Field of Classification Search
  CPC ... F01M 2013/0433; F01M 2013/0438; F01M 2013/0461; F01M 2013/0477; F01M 2013/0072; F04B 39/16; B01D 45/02; B01D 45/04; B01D 45/08
  See application file for complete search history.

(56) References Cited

U.S. PATENT DOCUMENTS

| | | | |
|---|---|---|---|
| 2,756,837 A | 7/1956 | Lovelady et al. | |
| 2,776,054 A | 1/1957 | Hirshstein | |
| 2,942,691 A | 6/1960 | Dillon | |
| 2,966,233 A | 12/1960 | Nelson | |
| 3,000,467 A | 9/1961 | Bowers | |
| 3,075,336 A | 1/1963 | Hays | |
| 3,201,924 A | 8/1965 | Fulford et al. | |
| 3,432,991 A | 3/1969 | Sauder et al. | |
| 4,136,009 A | 1/1979 | Samiran | |
| 4,167,164 A | 9/1979 | Bachmann | |
| 4,226,726 A | 10/1980 | Rehm | |
| 4,298,465 A | 11/1981 | Druffel | |
| 4,534,861 A | 8/1985 | Wedemeyer et al. | |
| 4,541,933 A | 9/1985 | Armold et al. | |
| 4,627,406 A | 12/1986 | Namiki et al. | |
| 4,668,256 A | 5/1987 | Billiet et al. | |
| 4,878,923 A | 11/1989 | Muller | |
| 4,892,569 A | 1/1990 | Kojima | |
| 4,982,569 A | 1/1991 | Bronicki | |
| 5,024,203 A * | 6/1991 | Hill ........ | F01M 13/04 123/572 |
| 5,145,497 A | 9/1992 | Maeda | |
| 5,171,130 A | 12/1992 | Kume et al. | |
| 5,595,588 A | 1/1997 | Blevins | |
| 6,000,383 A | 12/1999 | Diotte et al. | |
| 6,058,917 A | 5/2000 | Knowles | |
| 6,302,933 B1 | 10/2001 | Krause et al. | |
| 6,626,163 B1 | 9/2003 | Busen et al. | |
| 7,857,882 B1 | 12/2010 | Johnson | |
| 8,540,809 B2 * | 9/2013 | Minato ........ | B01D 53/0415 123/198 E |
| 9,017,460 B2 * | 4/2015 | Minato ........ | B01D 53/0407 96/147 |
| 9,533,246 B2 | 1/2017 | Sugio et al. | |
| 2002/0129586 A1* | 9/2002 | Tanaka ........ | F01M 13/04 55/320 |
| 2003/0074870 A1 | 4/2003 | Virgilio | |
| 2003/0110949 A1 | 6/2003 | Fornof et al. | |
| 2003/0172632 A1 | 9/2003 | Matsubara et al. | |
| 2004/0040273 A1 | 3/2004 | Lewin | |
| 2004/0238452 A1 | 12/2004 | Moore | |
| 2005/0092180 A1 | 5/2005 | Fornof et al. | |
| 2005/0188848 A1 | 9/2005 | Salzman et al. | |
| 2006/0130654 A1* | 6/2006 | King ........ | B01D 5/003 95/231 |
| 2006/0248921 A1* | 11/2006 | Hosford ........ | B01D 53/047 62/611 |
| 2006/0254566 A1 | 11/2006 | Yasuhara | |
| 2007/0175186 A1* | 8/2007 | Braziunas ........ | B01D 45/06 55/385.3 |
| 2007/0181472 A1 | 8/2007 | Dawes et al. | |
| 2007/0215128 A1 | 9/2007 | Yonebayashi et al. | |
| 2008/0011550 A1 | 1/2008 | Dunn et al. | |
| 2008/0105125 A1* | 5/2008 | Lauson ........ | F04B 39/16 95/288 |
| 2009/0056292 A1 | 3/2009 | Fornof et al. | |
| 2009/0071188 A1 | 3/2009 | Kusada et al. | |
| 2009/0193770 A1 | 8/2009 | Holzmann et al. | |
| 2009/0250044 A1 | 10/2009 | Braun et al. | |
| 2010/0006075 A1 | 1/2010 | Ruppel et al. | |
| 2010/0178236 A1* | 7/2010 | Rameshni ........ | B01D 19/0047 423/578.4 |
| 2010/0218682 A1 | 9/2010 | Hammerschick | |
| 2010/0229510 A1 | 9/2010 | Heinen et al. | |
| 2011/0088641 A1 | 4/2011 | Shudo et al. | |
| 2011/0113738 A1 | 5/2011 | Zachos | |
| 2011/0179755 A1 | 7/2011 | Gruhler et al. | |
| 2011/0308393 A1 | 12/2011 | Minato et al. | |
| 2012/0060452 A1* | 3/2012 | Sikkenga ........ | B01D 45/08 55/434.3 |
| 2012/0174537 A1 | 7/2012 | Tornblom et al. | |
| 2012/0180442 A1 | 7/2012 | Siber et al. | |
| 2012/0186451 A1* | 7/2012 | Duesel, Jr. ........ | B01D 1/14 95/272 |
| 2013/0167719 A1 | 7/2013 | Alper | |
| 2014/0345461 A1* | 11/2014 | Sikkenga ........ | B01D 45/16 95/272 |
| 2016/0008741 A1 | 1/2016 | Beg et al. | |

FOREIGN PATENT DOCUMENTS

| | | |
|---|---|---|
| CN | 1874920 A | 12/2006 |
| CN | 201221882 Y | 4/2009 |
| CN | 102317585 A | 1/2012 |
| DE | 742669 C | 12/1943 |
| DE | 10 2004 016742 B3 | 9/2005 |
| DE | 10 2006 008516 A1 | 8/2007 |
| DE | 102011002582 | 9/2011 |
| EP | 0 846 485 A1 | 11/1997 |
| GB | 2033247 | 5/1980 |
| JP | S47-029633 B | 8/1972 |
| JP | S52 13336 U | 1/1977 |
| JP | S52-65381 U | 5/1977 |
| JP | S52-155279 U | 11/1977 |
| JP | S53-122007 A | 10/1978 |
| JP | S55-126919 U | 9/1980 |
| JP | S56-163918 U | 12/1981 |
| JP | S57 181913 A | 11/1982 |
| JP | 58-64812 U | 5/1983 |
| JP | 59109284 A * | 6/1984 |
| JP | 60-80615 A | 5/1985 |
| JP | 60-84714 U | 6/1985 |
| JP | S62-071322 U | 5/1987 |
| JP | S62-99313 | 6/1987 |
| JP | S62-179014 U | 11/1987 |
| JP | 1-84725 U | 6/1989 |
| JP | 1-114025 U | 8/1989 |
| JP | H01-242119 A | 9/1989 |
| JP | 1-156729 U | 10/1989 |
| JP | 2-48125 U | 4/1990 |
| JP | 2-133419 U | 11/1990 |
| JP | H2-147212 | 12/1990 |
| JP | 3-30813 A | 2/1991 |
| JP | H03-164584 A | 7/1991 |
| JP | 3-246149 A | 11/1991 |
| JP | H03-115028 U | 11/1991 |
| JP | H04-27780 A | 1/1992 |
| JP | 4-59321 U | 5/1992 |
| JP | H04-053174 U | 5/1992 |
| JP | 4-70970 U | 6/1992 |
| JP | 4-78481 U | 7/1992 |
| JP | H04-110118 U | 9/1992 |
| JP | 05-037628 U | 5/1993 |
| JP | H05-83382 U | 11/1993 |
| JP | H05-296173 A | 11/1993 |
| JP | 63-157234 U | 5/1994 |
| JP | 2-106526 U | 11/1994 |
| JP | 6-330720 A | 11/1994 |

(56) References Cited

FOREIGN PATENT DOCUMENTS

| | | |
|---|---|---|
| JP | H06-346855 A | 12/1994 |
| JP | 7-4880 U | 1/1995 |
| JP | H07-197886 A | 1/1995 |
| JP | 07-013418 U | 3/1995 |
| JP | H07-8020 U | 3/1995 |
| JP | H07-227514 A | 8/1995 |
| JP | 7-243318 A | 9/1995 |
| JP | 7-269326 A | 10/1995 |
| JP | H7-332810 A | 12/1995 |
| JP | H08-173740 A | 7/1996 |
| JP | H08-233415 A | 9/1996 |
| JP | 8-290027 A | 11/1996 |
| JP | 9-177532 A | 7/1997 |
| JP | H10-176667 A | 6/1998 |
| JP | H10-211407 A | 8/1998 |
| JP | H10-323529 A | 12/1998 |
| JP | H11-108474 A | 4/1999 |
| JP | H11510757 A | 9/1999 |
| JP | 2000045749 | 2/2000 |
| JP | 2000-282839 A | 10/2000 |
| JP | 2002-97919 A | 4/2002 |
| JP | 2002-544421 A | 12/2002 |
| JP | 2003-531330 A | 10/2003 |
| JP | 2003-322084 A | 11/2003 |
| JP | 2004-232625 | 8/2004 |
| JP | 2005-066470 A | 3/2005 |
| JP | 2006-75814 | 3/2006 |
| JP | 2006-316641 A | 11/2006 |
| JP | 2007-016664 A | 1/2007 |
| JP | 2007-162248 A | 6/2007 |
| JP | 2007-247623 A | 9/2007 |
| JP | 2007-255397 A | 10/2007 |
| JP | 2008-2377 A | 1/2008 |
| JP | 2008-19857 A | 1/2008 |
| JP | 2008-202894 A | 9/2008 |
| JP | 2009-008096 A | 1/2009 |
| JP | 2009-109102 A | 2/2009 |
| JP | 2010-017823 | 1/2010 |
| JP | 2010-501788 A | 1/2010 |
| JP | 2010-270743 A | 12/2010 |
| JP | 2011-025205 A | 2/2011 |
| JP | 2011-027331 A | 2/2011 |
| JP | 2011-085118 A | 4/2011 |
| JP | 2011-157927 A | 8/2011 |
| JP | 10-296038 A | 11/2014 |
| WO | WO 88/02658 A1 | 4/1988 |
| WO | WO 00/68548 | 11/2000 |
| WO | WO 01/52973 A1 | 7/2001 |
| WO | WO 01/79664 A1 | 10/2001 |
| WO | WO 2007/036560 A1 | 4/2007 |

OTHER PUBLICATIONS

European Search Report in corresponding application No. EP 13755157.8, dated Dec. 15, 2015, pp. 1-8.
Non-Final Office Action issued by the U.S. Patent and Trademark Office dated Dec. 24, 2015, in connection with U.S. Appl. No. 14/380,830, 9 pgs.
English Translation of Japanese Notification of Reasons for Refusal dated Aug. 25, 2015 in connection with Japanese Patent Appln. No. JP2012-040580, 4 pages.
Partial Supplementary European Search Report dated Jan. 26, 2016 in connection with European Application No. EP 13754685, 7 pages.
First Office Action issued by the State Intellectual Property Office of the People's Republic of China and English translation thereof, dated Nov. 3, 2015 in connection with Chinese Application No. 201380010722.9, 12 pages.
English Translation of Japanese Notice of Reasons for Refusal dated Nov. 24, 2015 in connection with Japanese Patent Appln. No. 2012-040584, 6 pages.
English Translation of Japanese Notice of Reasons for Refusal dated Jan. 27, 2016 in connection with Japanese Patent Appln. No. 2012-147748, 6 pages.
Supplemental European Search Report dated Dec. 22, 2015 in connection with European Application No. EP 13755024, 7 pages.
English Translation of Japanese Notice of Reasons for Refusal dated Dec. 1, 2015 in connection with Japanese Patent Appln. No. 2012-040583, 4 pages.
Extended European Search Report dated Jun. 24, 2016 in connection with European Application No. EP 13754685, 9 pages.
Non-Final Office Action issued by the U.S. Patent and Trademark Office dated Apr. 22, 2016 in connection with U.S. Appl. No. 14/410,992, 17 pgs.
English Translation of Japanese Notification of Reasons for Refusal dated Apr. 26, 2016 in connection with Japanese Patent Appln. No. 2012-106869, 9 pages.
Extended European Search Report in connection with European Application No. EP 13788303 dated Aug. 16, 2016, 10 pages.
Extended European Search Report for European Application No. EP 13813863 dated Jul. 5, 2016, 6 pages.
Non-Final Office Action issued by the U.S. Patent and Trademark Office dated Aug. 1, 2016 in connection with U.S. Appl. No. 14/399,485, 28 pages.
Non-Final Office Action issued by the U.S. Patent and Trademark Office dated Sep. 27, 2016 in connection with U.S. Appl. No. 14/380,847, 13 pages.
U.S. Office Action for U.S. Appl. No. 14/399,485, dated Jan. 4, 2017.
Japanese Office Action for Application No. 2012-147748 dated Sep. 27, 2016.
Japanese Office Action for Application No. 2012-241234 dated Oct. 6, 2016.
Japanese Office Action for Application No. 2013-036394 dated Oct. 3, 2016.
Office Action for Japanese Application No. 2016-138862, dated Apr. 25, 2017.
Non-Final Office Action for U.S. Appl. No. 14/399,485, dated Jun. 6, 2017, 12 pages.
Office Action for Japanese Application No. 2016-138863, dated Jun. 27, 2017.
Office Action for Chinese Application No. 201610031843.7, dated May 27, 2017.
Office Action for Japanese Application No. 2013-098863, dated Jun. 5, 2017.
Office Action for Japanese Application No. 2013-098864, dated Jun. 16, 2017.
Office Action for Japanese Application No. 2017-026067, dated Oct. 31, 2017.
Office Action for U.S. Appl. No. 15/360,406, dated Apr. 3, 2018.
Japanese Office Communication for Application No. 2017-026067 dated Jun. 5, 2018.
Office Action for U.S. Appl. No. 14/380,847, dated Dec. 21, 2017.

* cited by examiner

US 10,087,798 B2

OIL SEPARATOR

TECHNICAL FIELD OF THE INVENTION

The present invention relates to an oil separator that separates oil contained in air that has passed through equipment.

BACKGROUND ART OF THE INVENTION

Vehicles such as trucks, buses, and construction machines utilize compressed air sent from a compressor, which is directly connected to an engine, to control systems such as brakes and suspensions. The compressed air contains water, which is contained in the atmosphere, and oil for lubricating the interior of the compressor. When the compressed air containing water and oil enters inside the systems, it causes rust and swelling of rubber members (such as O-rings) and results in an operational defect. Thus, an air dryer is provided downstream of the compressor in an air system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water absorbed by the desiccant and discharging it to the outside.

The air discharged from the air dryer during regeneration of the desiccant contains oil together with water. Considering the burden on the environment, an oil separator may be provided downstream of the compressor in the air system.

An impingement plate-type oil separator performs gas/liquid separation by allowing air that contains water and oil to strike an impingement plate provided in the housing to recover the oil from the air and discharge cleaned air (for example, Patent Document 2).

PRIOR ART DOCUMENTS

Patent Document

Patent Document 1: Japanese Laid-Open Patent Publication No. 10-296038
Patent Document 2: Japanese Laid-Open Patent Publication No. 2008-2377

SUMMARY OF THE INVENTION

The above-mentioned oil separator stores liquid that contains oil separated from the air at the bottom of the expansion chamber. Since the liquid also contains water, if the amount of water separated from the air is great, the time period until the liquid is stored to the limit of the storage capacity is reduced, and a liquid recovery interval (liquid recovery cycle) may possibly be reduced. Thus, an oil separator that has an extended liquid recovery interval (liquid recovery cycle) of the collected liquid has been desired.

Accordingly, it is an objective of the present invention to provide an oil separator that has an extended liquid recovery interval (liquid recovery cycle).

To achieve the foregoing objective and in accordance with one aspect of the present invention, an oil separator is provided that includes a housing including an inlet for air, an expansion chamber provided in the housing, and a heating device, which heats a lower part of the expansion chamber. The oil separator introduces air containing oil into the housing through the inlet, and separates and recovers the oil from the introduced air. The transverse cross-sectional area of the expansion chamber is greater than the opening area of the inlet.

In accordance with another aspect of the present invention, an oil separator is provided that includes a lid including an inlet for introducing purge air from an air dryer and an outlet for discharging cleaned air, a plurality of expansion chambers arranged next to one another in a vertical direction, a housing mountable to the lid, and a mounting and dismounting mechanism for allowing the lid to be detachable with respect to the housing. The oil separator causes the purge air to flow into the housing and strike an impingement member to separate oil from the purge air, thereby recovering liquid containing oil, and the oil separator discharges cleaned air. A through hole, which permits the purge air introduced through the inlet to flow vertically downward, is formed between the expansion chambers.

In accordance with yet another aspect of the present invention, an oil separator is provided that includes a housing including an inlet for introducing purge air from an air dryer and an outlet for discharging cleaned air, an expansion chamber provided in the housing, and a heating device for heating the housing. The oil separator causes the purge air to flow into the housing to separate oil from the purge air, thereby recovering a liquid that contains oil, and discharges cleaned air.

In accordance with a further aspect of the present invention, an oil separator is provided that includes a housing including an inlet for air and a drain outlet, and an impingement member provided in the housing. The oil separator introduces air containing oil into the housing through the inlet, and causes the air to strike the impingement member to separate oil from the introduced air, thereby recovering oil. The oil separator further includes an additional tank, which is connected to the drain outlet and stores a collected liquid stored in the housing.

BRIEF DESCRIPTION OF THE DRAWINGS

FIG. 16 is a perspective view illustrating the elbow member and the drip preventing member of FIG. 15;

MODE FOR CARRYING OUT THE INVENTION DETAILED DESCRIPTION OF THE PREFERRED EMBODIMENTS

First Embodiment

An oil separator according to a first embodiment of the present invention will now be described with reference to FIGS. 1 to 6. The oil separator is embodied in an exhaust system of an air dryer.

Figure 1:
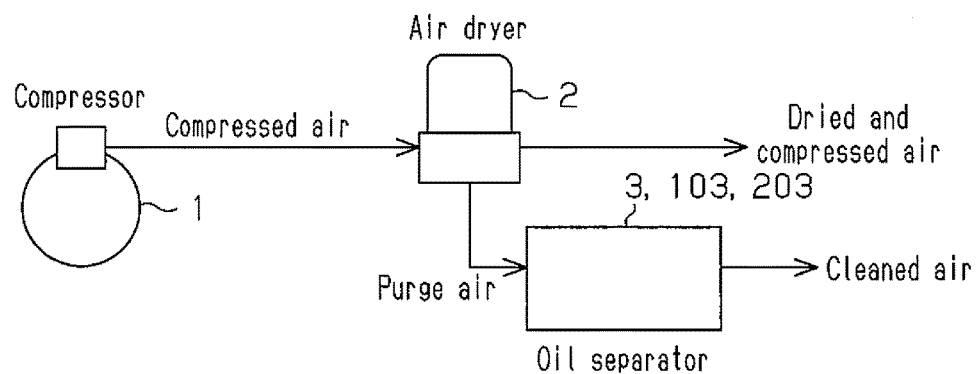
FIG. 1 is a block diagram illustrating an installation position of an oil separator according to a first embodiment of the present invention in an air system.

As shown in FIG. 1, vehicles such as trucks, buses, and construction machines utilize compressed air sent from a compressor 1 to control systems such as brakes and suspensions. Thus, an air dryer 2, which removes oil and water in the compressed air and provides dried air, is located downstream of the compressor 1 of an air system. A desiccant is provided in the air dryer 2. The air dryer 2 performs dehumidification to remove oil and water from the compressed air, and regeneration to regenerate the desiccant by removing the oil and the water absorbed by the desiccant and discharging them to the outside.

In the present embodiment, since air (purge air) discharged from the air dryer 2 during regeneration of the desiccant includes oil together with water, an oil separator 3 is provided downstream of the compressor 1 of the air system considering the burden on the environment. In particular, the oil separator 3 is provided in an exhaust system of the air dryer 2, and separates and recovers the oil and the water from purge air discharged during regeneration of the desiccant in the air dryer 2.

The oil separator 3 is an impingement plate-type oil separator and includes, inside the housing, impingement plates, against which air containing oil and water strikes. The impingement plate-type oil separator 3 performs gas/liquid separation by allowing the air containing oil and water to strike the impingement plates. In this manner, the oil separator 3 recovers oil from air, and discharges cleaned air.

Figure 2:
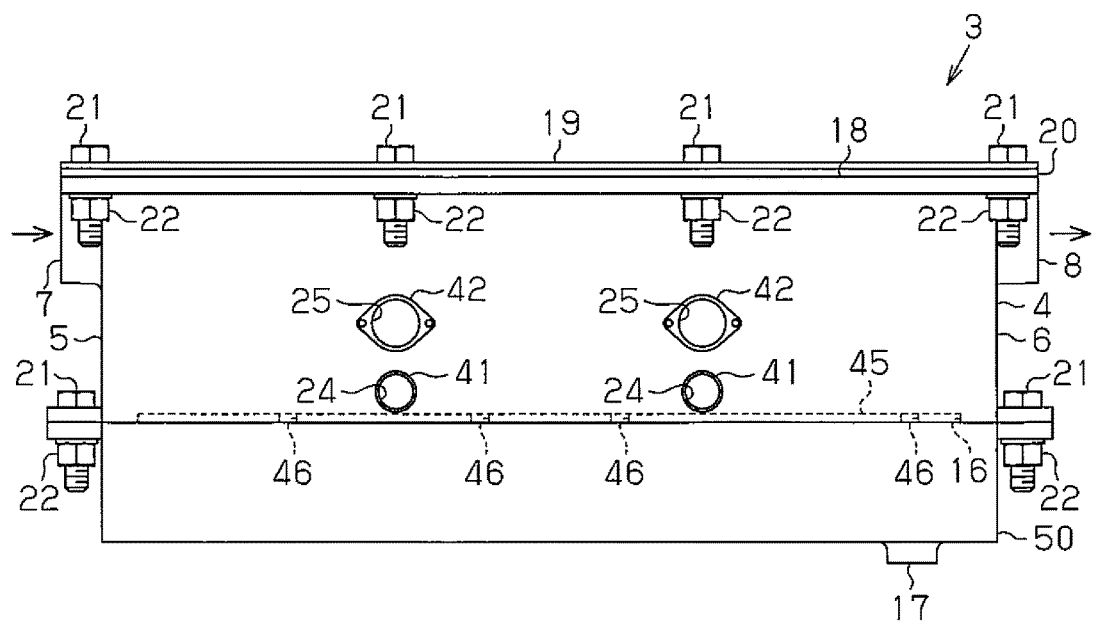
FIG. 2 is a side view illustrating the external structure of the oil separator of FIG. 1.

As shown in FIG. 2, the oil separator 3 includes a rectangular parallelepiped housing 4, which extends in the horizontal direction. An inlet 7 and an outlet 8 are respectively formed in a front side 5 and a rear side 6 of the housing 4. The front side 5 and the rear side 6 are opposed to each other in the longitudinal direction. That is, air passes through the oil separator 3 from left to right in FIG. 2.

An opening portion 16 is formed in the bottom face of the housing 4. A collected liquid storage portion 50, which stores liquid that is separated from the air and collected, is mounted on the bottom face of the housing 4 with bolts 21 and nuts 22. The collected liquid contains oil and water. The collected liquid storage portion 50 is a box that is open upward. The bolts 21 and the nuts 22 configure a mounting and dismounting mechanism.

Also, a liquid communication portion 45 is fitted in the opening portion 16 of the bottom face of the housing 4. Liquid communication holes 46, which connect the interior of the housing 4 to the collected liquid storage portion 50, are formed in the liquid communication portion 45. The liquid communication portion 45 and the opening portion 16 configure the mounting and dismounting mechanism. Furthermore, a drain outlet 17, which discharges the collected liquid, is formed at part of a bottom face 51 of the collected liquid storage portion 50 close to the rear side 6.

Furthermore, an opening portion 18 is formed in the upper surface of the housing 4. The opening portion 18 is closed by a rectangular lid 19. A sealing sheet 20, which covers the entire opening portion 18, is sandwiched between the opening portion 18 and the lid 19. The lid 19, the sealing sheet 20, and the housing 4 are tightly secured by bolts 21 and nuts 22. The lid 19 restricts movement of members accommodated in the housing 4.

Figure 3:
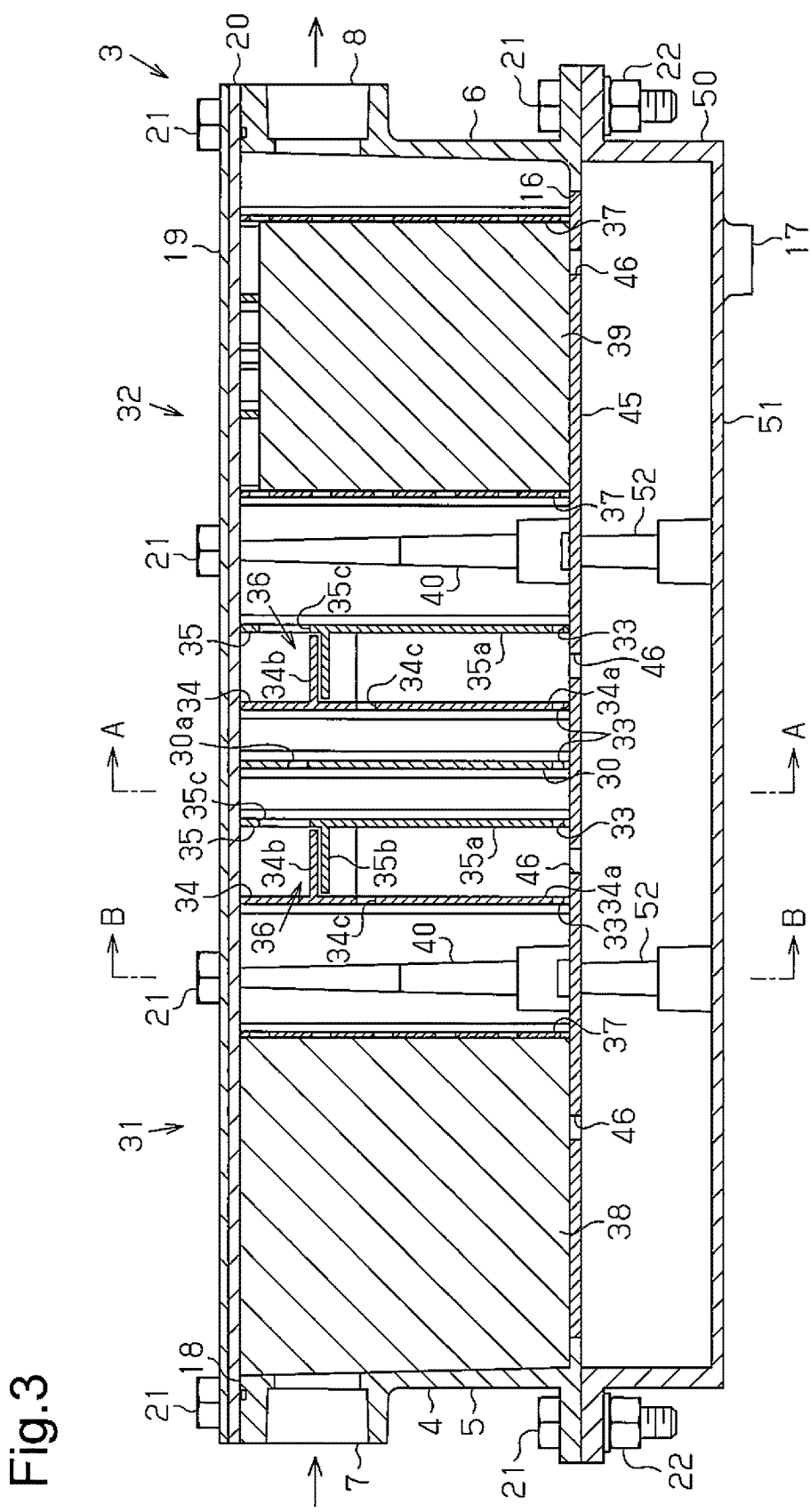
FIG. 3 is a vertical cross-sectional view illustrating the internal structure of the oil separator of FIG. 1.

As shown in FIG. 3, a plate-like partition wall 30 is provided at a longitudinal center portion in the housing 4. The inside of the housing 4 is divided by the partition wall 30 into a primary expansion chamber 31 close to the inlet 7 and a secondary expansion chamber 32 close to the outlet 8 in the horizontal direction. The transverse cross-sectional areas of the primary expansion chamber 31 and the secondary expansion chamber 32 are each greater than the transverse cross-sectional area of the inlet 7. The transverse cross-sectional area here corresponds to an area of a cross-section perpendicular to the longitudinal direction of the housing 4. Thus, since the air introduced into the expansion chambers expands, the flow velocity in the expansion chambers is reduced. Since the flow velocity of the air is reduced, the saturated vapor pressure is further reduced. This causes oil and water to easily condense, increasing the mass of particles of oil and water and allowing them to easily strike the impingement plates.

A through hole (orifice hole) 30a is formed at the upper section of the partition wall 30. Thus, the partition wall 30 functions as an orifice, which controls the flow of air from the primary expansion chamber 31 to the secondary expansion chamber 32 by the orifice hole 30a. Also, a communication hole 33 is formed at the lower section of the partition wall 30 in the vicinity of the opening portion 16. The communication hole 33 permits the collected liquid separated from the air and recovered to pass between the expansion chambers 31, 32.

Furthermore, impingement plates 34, 35, which are opposed to each other, are provided on both sides of the partition wall 30 in the housing 4. The first impingement plate 34 located toward the upstream end includes a first upright plate 34a, which extends from the opening portion 16 of the housing 4 to the lid 19, and a first baffle plate 34b, which extends perpendicularly from the first upright plate 34a in the longitudinal direction of the housing 4 toward the outlet 8. The first upright plate 34a includes a rectangular first through hole 34c, which extends in the widthwise direction of the impingement plates 34, 35, at a position lower than the joint to the first baffle plate 34b.

The second impingement plate 35 located toward the downstream end includes a second upright plate 35a, which extends from the opening portion 16 of the housing 4 to the lid 19, and a second baffle plate 35b, which extends perpendicularly from the second upright plate 35a in the longitudinal direction of the housing 4 toward the inlet 7. The second upright plate 35a includes a rectangular second through hole 35c, which extends in the widthwise direction of the impingement plates 34, 35 at a position upper than the joint to the second baffle plate 35b.

The first baffle plate 34b and the second baffle plate 35b project to obstruct the flow of air, and form an extremely narrow section 36. The extremely narrow section 36 is a narrow gap formed by arranging the wide surfaces of the first baffle plate 34b and the second baffle plate 35b close to each other. The first baffle plate 34b is located closer to the lid 19 than the second baffle plate 35b. The extremely narrow section 36 increases the flow velocity of the air and creates a meandering path, which further increases chances for oil and water particles to strike the plates. This causes the oil and the water to be further reliably separated from the air. Furthermore, since the baffle plates 34b, 35b are provided, the oil and the water that have dropped while passing between the first impingement plate 34 and the second impingement plate 35 are prevented from being lifted or stirred up by the air that passes between the first impingement plate 34 and the second impingement plate 35 and from being carried downstream through the second through hole 35c. Thus, the quantity of the collected liquid is prevented from being reduced. Communication holes 33 are each formed at the lower sections of the first impingement plate 34 or the second impingement plate 35 in the vicinity of the opening portion 16. The communication holes 33 allow the liquid that has been separated from the air and recovered to pass through the communication holes 33.

In the internal space of the primary expansion chamber 31, the pair of impingement plates 34, 35 is provided. A urethane foam 38 such as a sponge is located between the inlet 7 and the pair of impingement plates 34, 35. A punched metal plate 37 in which bores are formed is mounted on the side of the urethane foam 38 facing the impingement plate 34. The urethane foam 38 traps the oil and the water contained in the air.

The pair of impingement plates 34, 35 is also provided in the internal space of the secondary expansion chamber 32. A crushed aluminum member 39 is located between the pair of impingement plates 34, 35 and the outlet 8. Punched metal plates 37 in which bores are formed are respectively mounted on the surfaces of the crushed aluminum member 39 facing the impingement plate 35 and the outlet 8. That is, the crushed aluminum member 39 is sandwiched between the pair of punched metal plates 37. The crushed aluminum member 39 traps the oil and the water contained in the air.

Ribs 40, which increase the strength of the housing 4, are each provided in the expansion chambers 31, 32. The collected liquid storage portion 50 is provided with four ribs 52 for increasing the strength. The liquid communication holes 46 of the liquid communication portion 45 are arranged such that each of the expansion chambers 31, 32 has two of the liquid communication holes 46, and the liquid communication holes 46 respectively correspond to the urethane foam 38, the impingement plates 34, 35, and the crushed aluminum member 39.

Figure 4:
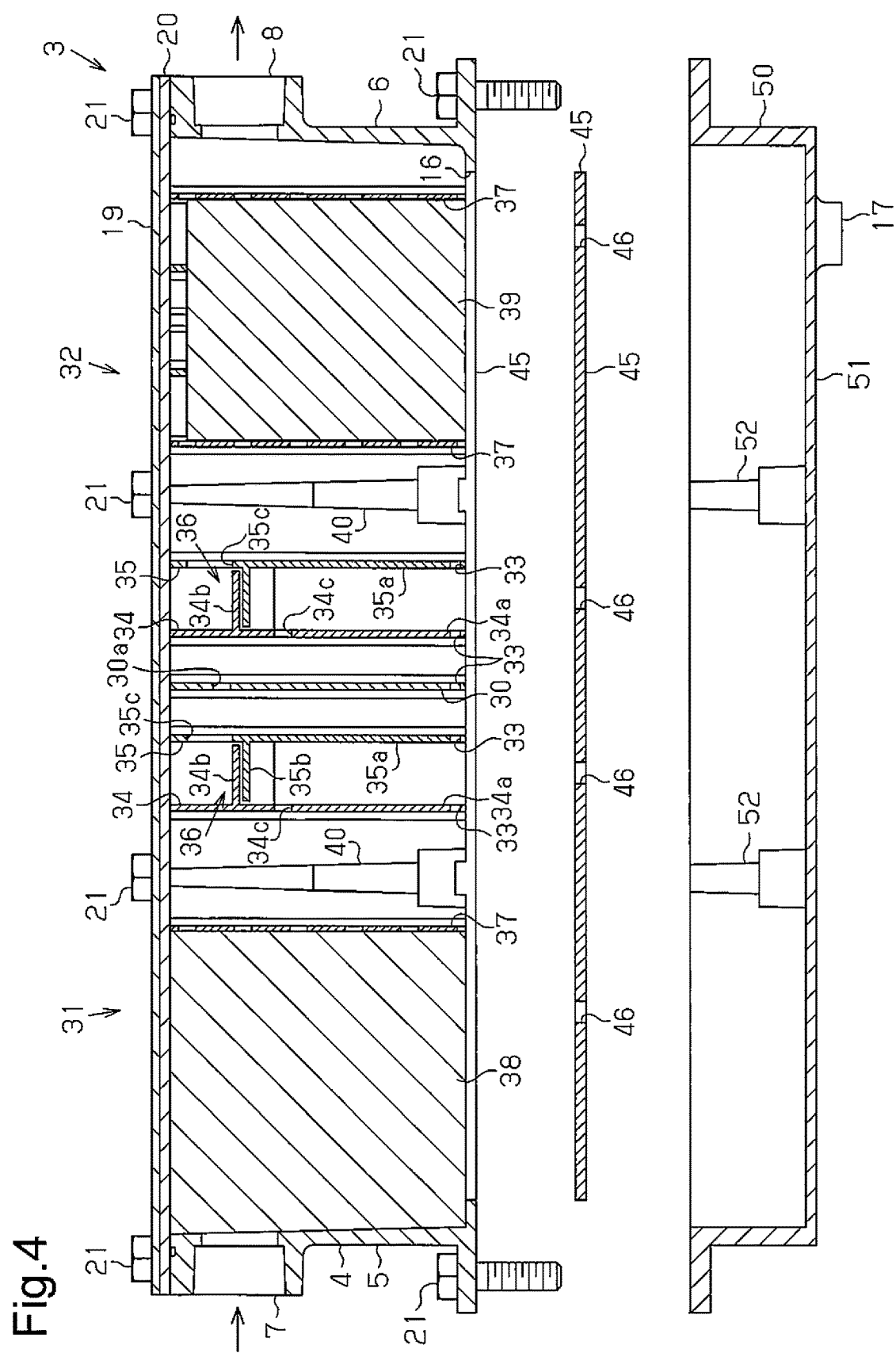
FIG. 4 is a vertical cross-sectional view illustrating a state in which the oil separator of FIG. 3 is disassembled.

As shown in FIG. 4, the liquid communication portion 45 and the collected liquid storage portion 50 are detachable with respect to the housing 4. That is, the liquid communication portion 45 is fitted to the opening portion 16 of the housing 4, and the collected liquid storage portion 50 is attached to the bottom face of the housing 4. Thus, the collected liquid stored in the liquid communication portion 45 and the collected liquid storage portion 50 is easily removed by dismounting the liquid communication portion 45 and the collected liquid storage portion 50 from the housing 4.

Figure 5:
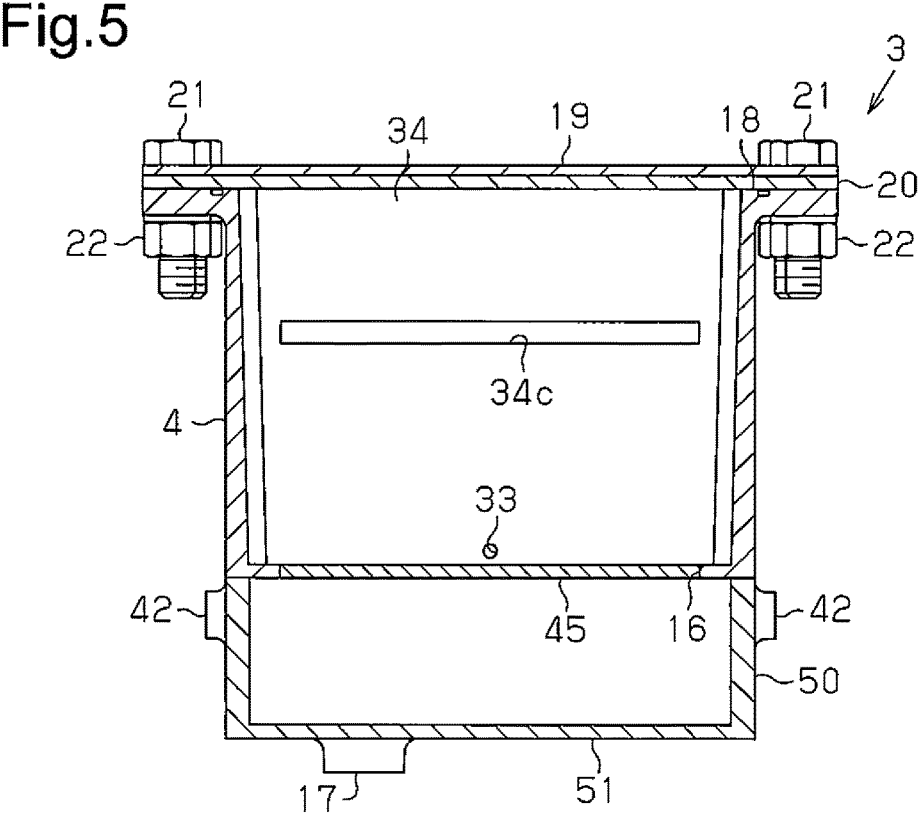
FIG. 5 is a cross-sectional view taken along line A-A of FIG. 3.

As shown in FIG. 5, the collected liquid storage portion 50, which is attached to the lower part of the housing 4, is hollow and is capable of storing collected liquid until the liquid level of the collected liquid reaches the lower surface of the liquid communication portion 45.

Figure 6:
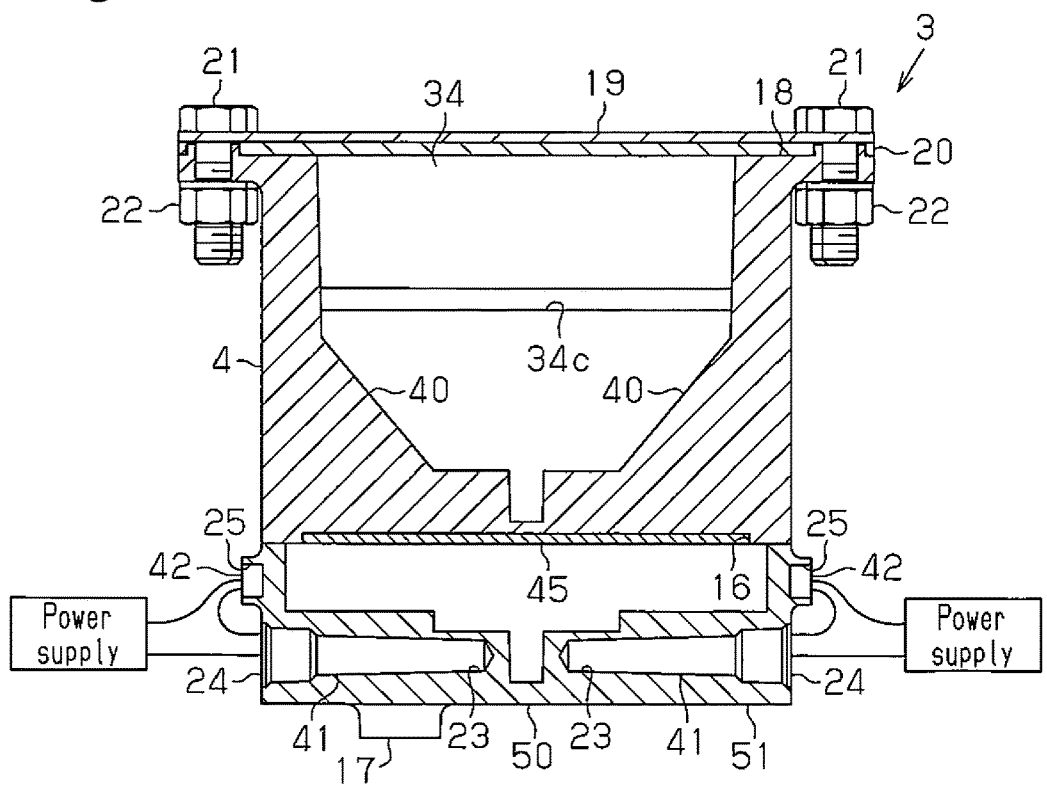
FIG. 6 is a cross-sectional view taken along line B-B of FIG. 3.

As shown in FIG. 6, columnar accommodation portions 23 for accommodating heating means (heating devices), which are heaters 41 in this embodiment, are formed in each rib 52 of the collected liquid storage portion 50 close to the bottom face 51. Insertion openings 24 for inserting the heaters 41 are formed in the outer surface of the collected liquid storage portion 50. The insertion openings 24 are each connected to the associated accommodation portion 23. The heaters 41 are columnar and are each inserted in the associated accommodation portion 23 from the outer surface of the collected liquid storage portion 50. Each heater 41 is connected to a power supply.

Also, a mounting hole 25 for mounting a thermostat 42 is formed in the outer surface of the collected liquid storage portion 50 above each insertion opening 24. Each thermostat 42 is mounted to the associated mounting hole 25, and is connected to the associated power supply and the associated heater 41. Each thermostat 42 detects the temperature of the collected liquid storage portion 50, and controls heating of the associated heater 41 based on the detected temperature. The water contained in the collected liquid that is stored at the bottom face of the collected liquid storage portion 50 is evaporated as much as possible by heating the collected liquid storage portion 50 with the heaters 41 so that liquid containing high concentration of oil is generated.

Operation of the above-mentioned oil separator will now be described.

The air introduced from the inlet 7 into the primary expansion chamber 31 passes through the urethane foam 38 while the oil and the water are trapped by the urethane foam 38, and then passes through the first through hole 34c of the first impingement plate 34 in the primary expansion chamber 31. At this time, the oil and the water that have struck the first upright plate 34a are separated from the air. The air that has passed through the first through hole 34c flows toward the extremely narrow section 36, which is formed by the first baffle plate 34b and the second baffle plate 35b, and passes through the extremely narrow section 36. At this time, the oil and the water that have struck the second upright plate 35a and the second baffle plate 35b are separated from the air.

The collected liquid, which contains the water and the oil trapped by the urethane foam 38, moves along the inside of the urethane foam 38. The collected liquid drops through the liquid communication hole 46 that is located below the urethane foam 38 into the collected liquid storage portion 50, and is stored in the collected liquid storage portion 50. The liquid that has struck the first impingement plate 34 in the primary expansion chamber 31 and separated from the air passes through the communication hole 33 of the first impingement plate 34, drops through the liquid communication hole 46 located below the impingement plates 34, 35 into the collected liquid storage portion 50, and is stored in the collected liquid storage portion 50.

The air that has passed through the extremely narrow section 36 passes through the second through hole 35c of the second upright plate 35a toward the orifice hole 30a of the partition wall 30, and passes through the orifice hole 30a. At this time, the oil and the water that has struck the partition wall 30 are separated from the air. The liquid that has struck the second impingement plate 35 in the primary expansion chamber 31 and separated from the air drops through the liquid communication hole 46 located below the impingement plates 34, 35 into the collected liquid storage portion 50, and is stored in the collected liquid storage portion 50.

The air that has passed through the orifice hole 30a in the partition wall 30 passes through the first through hole 34c of the first upright plate 34a in the secondary expansion chamber 32. At this time, the oil and the water that have struck the first upright plate 34a are separated from the air. The air that has passed through the first through hole 34c flows toward the extremely narrow section 36, which is formed by the first baffle plate 34b and the second baffle plate 35b, and passes through the extremely narrow section 36. At this time, the oil and the water that have struck the second upright plate 35a and the second baffle plate 35b are separated from the air.

The liquid that has struck the partition wall 30 and separated from the air passes through the communication hole 33 in the partition wall 30 and the communication hole 33 of the first impingement plate 34 in the secondary expansion chamber 32, drops through the liquid communication hole 46 located below the impingement plates 34, 35 into the collected liquid storage portion 50, and is stored in the collected liquid storage portion 50.

The air that has passed through the extremely narrow section 36 passes through the second through hole 35c of the second upright plate 35a toward the crushed aluminum member 39, and passes through the crushed aluminum member 39. At this time, the air introduced into the crushed aluminum member 39 passes through the crushed aluminum member 39 while the oil and the water are further trapped by the crushed aluminum member 39, and cleaned air that does not contain oil is discharged to the outside from the outlet 18.

The liquid that has struck the first impingement plate 34 of the secondary expansion chamber 32 and separated from the air passes through the communication hole 33 of the first impingement plate 34, drops through the liquid communication hole 46 located below the impingement plates 34, 35 into the collected liquid storage portion 50, and is stored in the collected liquid storage portion 50. The liquid that has struck the second impingement plate 35 of the secondary expansion chamber 32 and separated from the air, drops through the liquid communication hole 46 located below the impingement plates 34, 35 into the collected liquid storage portion 50, and is stored in the collected liquid storage portion 50. The liquid trapped by the crushed aluminum member 39 moves along the interior of the crushed aluminum member 39, and drops from the liquid communication hole 46 located below the crushed aluminum member 39 into the collected liquid storage portion 50, and is stored in the collected liquid storage portion 50.

The collected liquid stored in the collected liquid storage portion 50 is heated by the heaters 41. This causes the water in the collected liquid to evaporate. The collected liquid containing a high concentration of oil is discharged from the drain outlet 17. When removing the collected liquid stored in the collected liquid storage portion 50, the inside of the collected liquid storage portion 50 can be cleaned by dismounting the collected liquid storage portion 50 from the housing 4.

The above-described embodiment has the following advantages.

(1) Since the heaters 41 are provided below the expansion chambers 31, 32, the liquid containing the oil and the water that has struck the impingement plates 34, 35 and stored below the expansion chambers 31, 32 is heated by the heaters 41. Thus, the water in the collected liquid is evaporated. This reduces the water in the stored liquid to increase the concentration of the oil, reduces the stored amount of the liquid, and thus extends the liquid recovery interval (liquid recovery cycle) of collected liquid. Furthermore, by heating the housing 4 with the heaters 41, the oil separator 3 is prevented from getting into a situation where the collected liquid cannot be discharged through the drain outlet 17 due to freezing of the collected liquid in the cold climate areas.

(2) The accommodation portions 23 located below the housing 4 accommodate the heaters 41. Since the heaters 41 heat the housing 4, the heaters 41 are prevented from being deteriorated by the collected liquid containing the oil and the water.

(3) The mounting and dismounting mechanism including the bolts 21 and the nuts 22 allows the collected liquid storage portion 50 to be dismounted from the housing 4. Thus, the collected liquid storage portion 50 can be cleaned in a state dismounted from the housing 4. In particular, removal of oil is easy when oil is adhered to the inner wall of the collected liquid storage portion. Furthermore, using a disposable collected liquid storage portion allows the collected liquid to be easily recovered.

Second Embodiment

An oil separator according to a second embodiment of the present invention will now be described with reference to FIGS. 7 and 8. The oil separator is embodied in an exhaust system of an air dryer. The oil separator of the present embodiment differs from the first embodiment in that the oil separator separates water from liquid stored in the collected liquid storage portion, and then heats the separated water with a heater. Differences from the first embodiment will mainly be discussed below. The oil separator of the present embodiment has substantially the same structure as the oil separator according to the first embodiment shown in FIG. 1.

Figure 7:
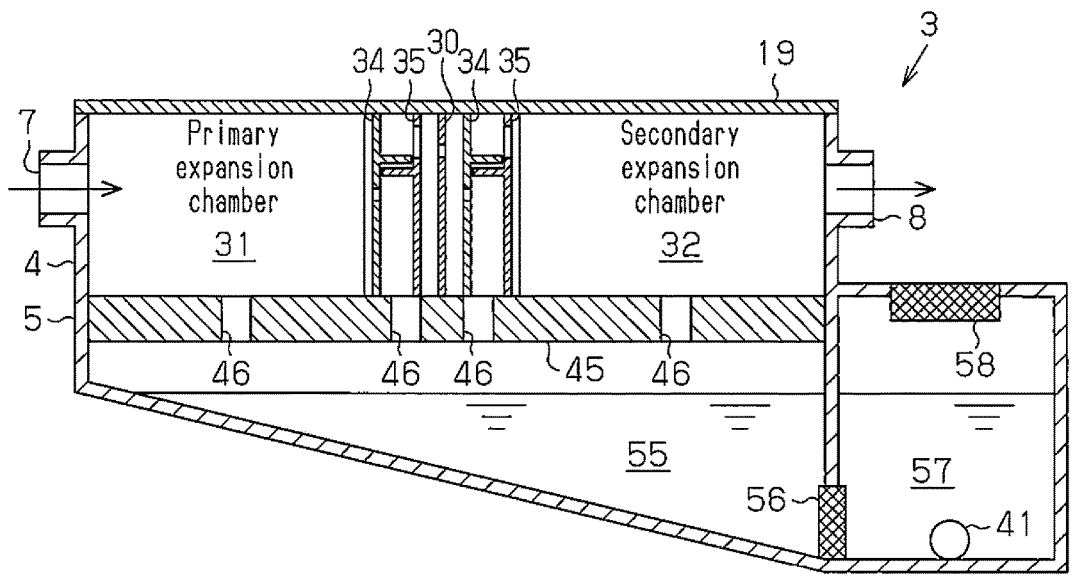
FIG. 7 is a vertical cross-sectional view illustrating the internal structure of an oil separator according to a second embodiment of the present invention.

As shown in FIG. 7, a first liquid pan 55, which stores recovered liquid, is provided below the housing 4. The bottom portion of the first liquid pan 55 is inclined such that the depth in the vertical direction increases toward the secondary expansion chamber 32 in the longitudinal direction of the housing 4. A box-like second liquid pan 57 is provided on the outer surface of the first liquid pan 55 close to the secondary expansion chamber 32. The first liquid pan 55 communicates with the second liquid pan 57 at a position close to the bottom face. Thus, only the water contained in the collected liquid moves from the first liquid pan 55 to the second liquid pan 57 through the communication section. A liquid filter 56 is provided at the communication section to prevent entry of the oil. A heater 41 for heating the collected liquid is provided close to the bottom face of the second liquid pan 57. A water vapor filter 58, which permits only water vapor to pass through, is provided on the upper surface of the second liquid pan 57 such that only the water is discharged to the outside.

If the water and the oil contained in the collected liquid are not easily separated in the first liquid pan 55, a separation reagent is desirably added to the first liquid pan 55 to separate the oil.

Operation of the oil separator 3 configured as described above will now be described with reference to FIG. 8.

Figure 8:
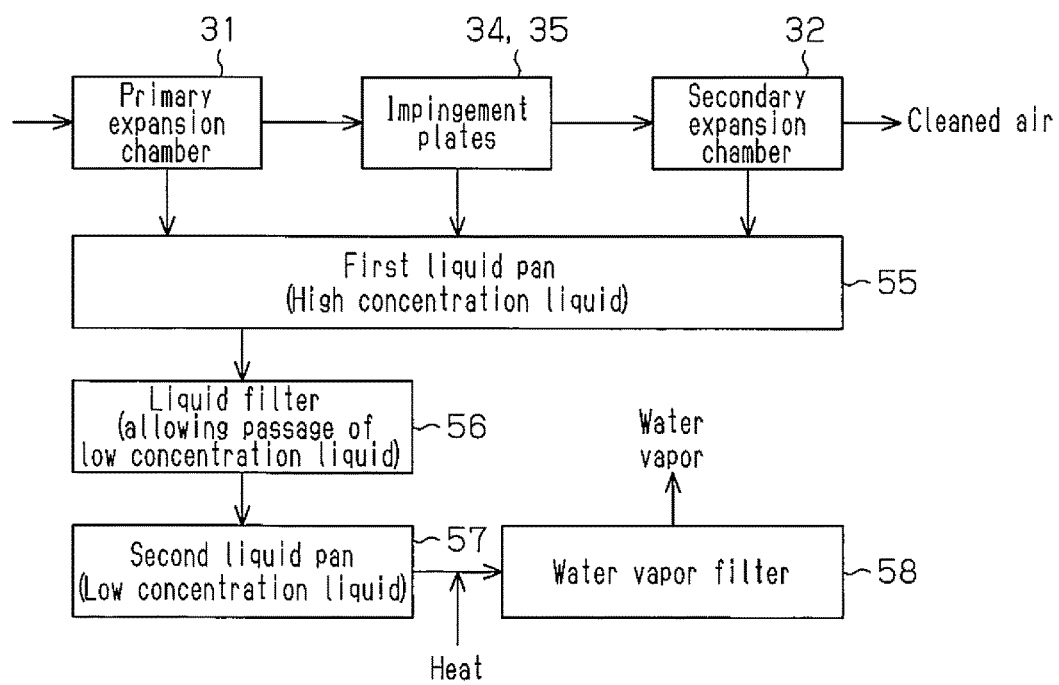
FIG. 8 is a block diagram illustrating the structure of the oil separator of FIG. 7.

As shown in FIG. 8, as oil is separated from the air through the primary expansion chamber 31, the impingement plates 34, 35, and the secondary expansion chamber 32, cleaned air that does not contain oil is discharged to the outside. The liquid separated from the air and recovered through the primary expansion chamber 31, the impingement plates 34, 35, and the secondary expansion chamber 32 is stored in the first liquid pan 55.

The liquid stored in the first liquid pan 55 contains a relatively high concentration of oil. If the water and the oil are separated in the collected liquid, the oil moves upward, and the water moves downward. The collected liquid stored in the first liquid pan 55 passes through the liquid filter 56 to the second liquid pan 57. The collected liquid stored in the second liquid pan 57 contains a relatively low concentration of oil since the water has moved downward.

The collected liquid stored in the second liquid pan 57 is heated by the heater 41 to evaporate the water in the collected liquid. The water vapor generated by heating with the heater 41 is discharged to the outside via the water vapor filter 58.

The present embodiment has the following advantages in addition to the advantages (1) to (3) of the first embodiment.

(4) In the first liquid pan 55, only the water is separated from the collected liquid, and the separated water is evaporated by the heater 41. Thus, the amount of heat required evaporate the water is reduced.

Third Embodiment

An oil separator according to a third embodiment will now be described with reference to FIGS. 11 to 17.

Figure 11:
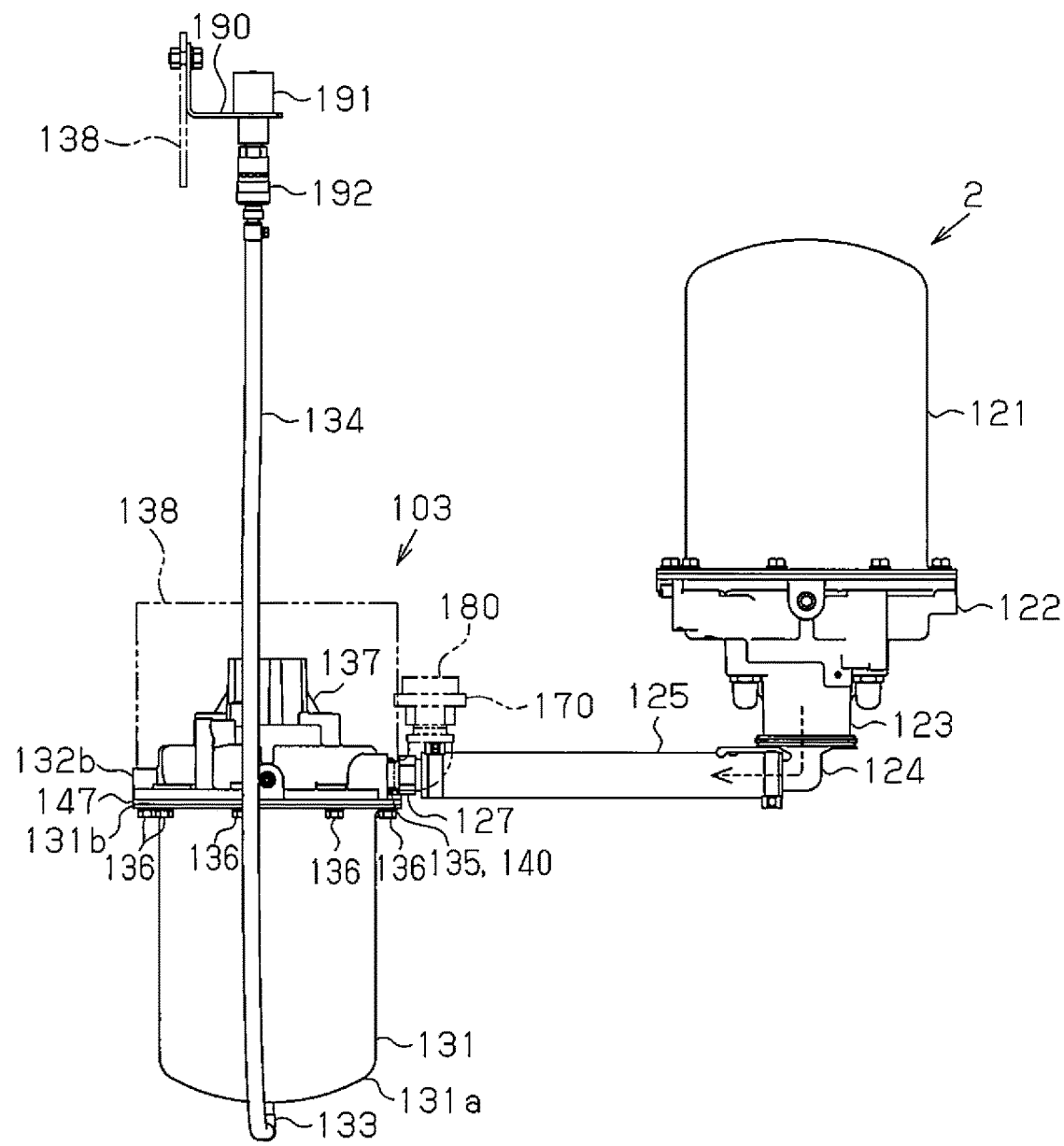
FIG. 11 is a view illustrating a mounting state of an oil separator according to a third embodiment of the present invention and a connection state of the oil separator and an air dryer.

As shown in FIG. 11, the air dryer 2 includes a cylindrical case 121 having the vertically upper end closed, and a support member 122, which closes the opening portion of the case 121 and supports the case 121. A purge air outlet 123, which discharges purge air during regeneration of a desiccant, is formed below the support member 122. A purge air discharge cover 124, to which a connecting hose 125 is connected, is mounted to the purge air outlet 123. The connecting hose 125 is connected to an oil separator 103. An inlet (not shown), which introduces compressed air compressed by the compressor 1, and an outlet (not shown), which discharges dried compressed air, are formed in the support member 122 of the air dryer 2.

The oil separator 103 includes a cylindrical housing having a closed end and extending in the vertical direction, which is a case 131 in this embodiment, and a lid 132, which closes the opening portion of the case 131. A drain outlet 133 for discharging the stored collected liquid is provided at a bottom portion 131a of the case 131. A drain hose 134, which is used when removing the collected liquid, is connected to the drain outlet 133. The lid 132 has an inlet 135 for introducing the purge air from the air dryer 2 through the connecting hose 125, and an outlet 140 for discharging cleaned air from which oil is separated. The inlet 135 and the outlet 140 are separately formed. The inlet 135 and the connecting hose 125 are connected by a coupling member 127.

A mounting member 137 is formed integrally with the lid 132 of the oil separator 103 to extend upright from the lid 232. The mounting member 137 is secured to a chassis 138 with bolts 139.

The distal end of the drain hose 134 is detachably mounted to a support member 190, which is secured to, for example, the chassis 138 of a vehicle. That is, a securing member 191 is secured to the support member 190. A one-touch coupler 192 is secured to the lower end of the securing member 191. The one-touch coupler 192 allows the distal end of the drain hose 134 to be attached to the securing member 191 by a single operation. The drain hose 134 is secured to the securing member 191 by inserting the distal end of the drain hose 134 to the one-touch coupler 192, and is detached from the securing member 191 by manipulating the one-touch coupler 192. The distal end of the drain hose 134 is attached to the securing member 191 to face vertically upward.

An elbow member 160, which extends in the horizontal direction and bends vertically upward, is screwed to the outlet 140 of the oil separator 103. A drip preventing member 170 and a cover 180 for preventing entry of foreign matter are mounted on the distal end of the elbow member 160.

Figure 12:
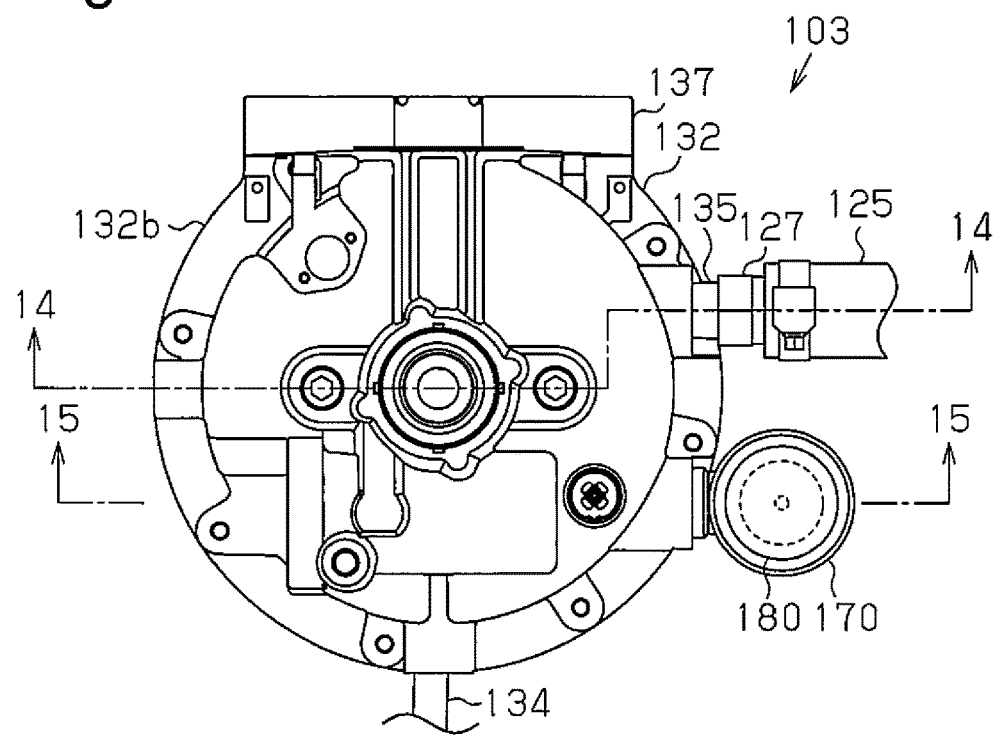
FIG. 12 is a top view illustrating the position of an inlet and an outlet of the oil separator of FIG. 11.
Figure 13:
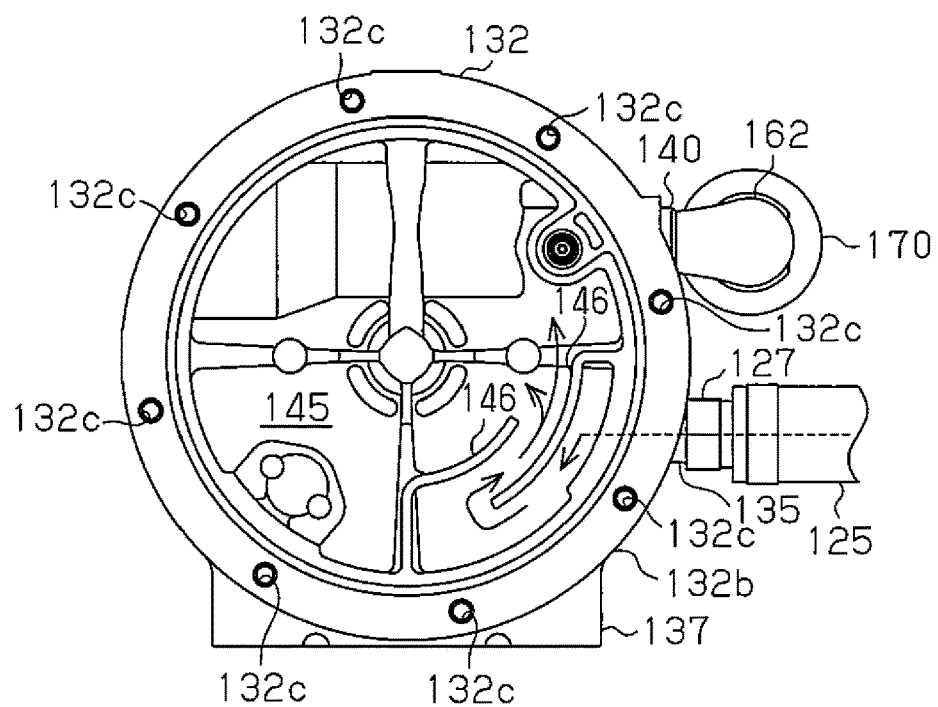
FIG. 13 is a bottom view illustrating the inside of the lid of the oil separator of FIG. 12.

As shown in FIGS. 12 and 13, the lid 132 has the inlet 135 and the outlet 140, which are open toward the same direction (rightward in the drawing). The inlet 135 and the outlet 140 are respectively provided on a horizontal surface. The connecting hose 125 is connected to the inlet 135 via the coupling member 127. The elbow member 160 is connected to the outlet 140. That is, the coupling member 127 and the elbow member 160 are arranged next to each other.

As shown in FIG. 13, the lid 132 is a cylinder having a vertically upper end closed. Two baffle plates 146 extend from the inner wall of the lid 132 in the vicinity of the inlet 135 to be perpendicular to the flow direction of the purge air introduced through the inlet 135. The internal space of the lid 132 functions as a first expansion chamber 145, which expands the purge air introduced through the inlet 135. The transverse cross-sectional area of the passage of the purge air formed in the first expansion chamber 145 is greater than the cross-sectional area of the inlet 135. The transverse cross-sectional area here corresponds to the area of a cross-section perpendicular to the flow direction of the purge air. The lid 132 has a communication section 132a, which connects the inside of the case 131 to the outlet 140.

Figure 14:
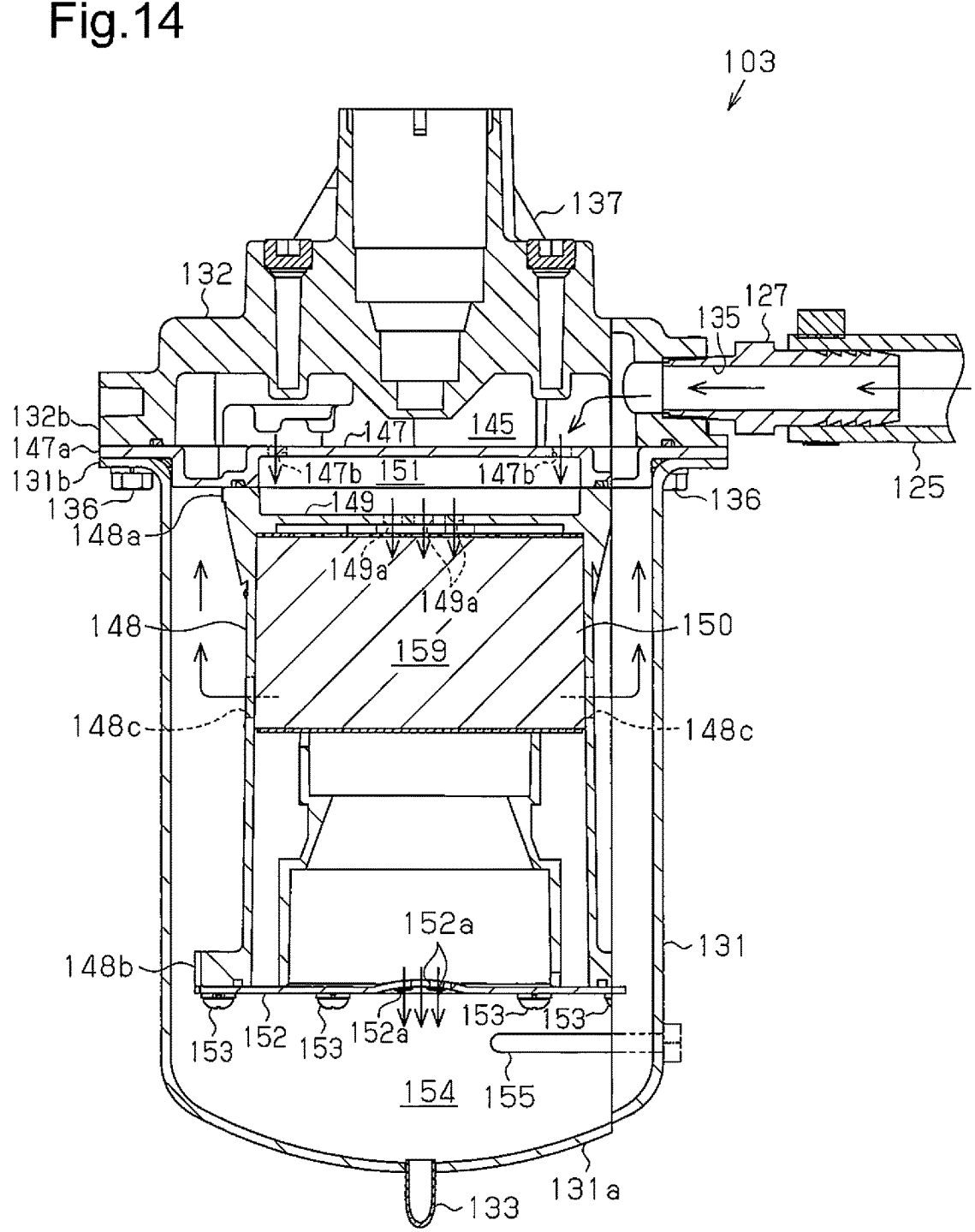
FIG. 14 is a cross-sectional view taken along line 14-14 of FIG. 12.
Figure 15:
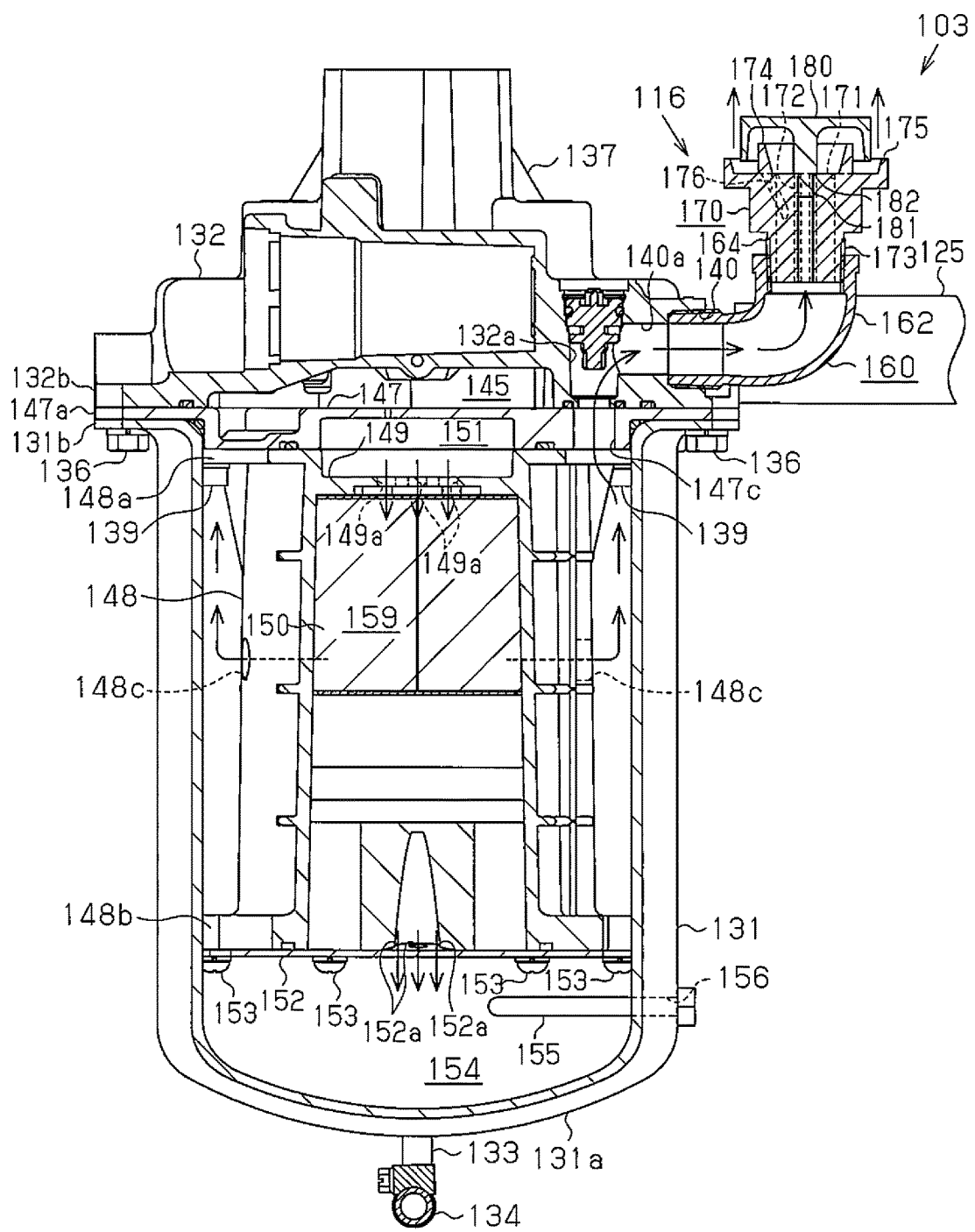
FIG. 15 is a cross-sectional view taken along line 15-15 of FIG. 12.

As shown in FIGS. 14 and 15, a disk-like cover 147, which closes the case 131 and the opening portion of the lid 132, is provided between the case 131 and the lid 132. The cover 147 and the case 131 are tightened to the lid 132 with bolts 136. That is, the bolts 136 are tightened to threaded bores 132c formed in a flange portion 132b provided on the lid 132. The bolts 136 and the threaded bores 132c function as the mounting and dismounting mechanism. Furthermore, threaded portions of the bolts 136 extend through through-holes formed in a flange portion 131b provided on the case 131. The cover 147 has through-holes through which the threaded portions of the bolts 136 extend. Thus, the threaded portions of the bolts 136 extend through the through-holes of the flange portion 131b of the case 131 and the through-holes of a flange portion 147a of the cover 147. The bolts 136 are then screwed to the threaded bores 132c of the flange portion 132b of the lid 132 so that the lid 132, the cover 147, and the case 131 are tightened together. The case 131 can be dismounted from the lid 132 by removing the bolts 136 form the threaded bores 132c. The cover 147 has a communication hole 147c, which connects the inside of the case 131 to the outlet 140.

The space formed by the lid 132 and the cover 147 functions as the first expansion chamber 145. A cylindrical accommodation member 148 having a vertically upper end closed is secured to the cover 147 with bolts 136. The accommodation member 148 accommodates a urethane foam 150 such as a sponge. The urethane foam 150 functions as an impingement member. A flange portion 148a and a flange portion 148b are formed at an upper edge and a lower edge of the accommodation member 148. The bolts 136 extend through the flange portion 148a formed at the upper edge of the accommodation member 148 so that the accommodation member 148 is tightened to the cover 147. The space formed by the cover 147 and the upper surface of the accommodation member 148 functions as a second expansion chamber 151. The cover 147 has through holes 147b, which connect the first expansion chamber 145 to the second expansion chamber 151. Through holes 149a are formed at the center portion of an upper base 149 of the accommodation member 148. The through holes 147b of the cover 147 and the through holes 149a of the upper base 149 of the accommodation member 148 are formed at positions that are not opposed to each another. Through holes 148c are formed at the lower end of the side face of the accommodation member 148 to be spaced apart in the radial direction.

A disk-like support lid 152 is secured to the flange portion 148b, which is formed at the lower edge of the accommodation member 148, with screws 153. The support lid 152 supports the urethane foam 150 accommodated in the accommodation member 148. The inner diameter of the support lid 152 is substantially the same as the inner diameter of the case 131. The space formed by the upper base 149 of the accommodation member 148 and the support lid 152 functions as a third expansion chamber 159. The support lid 152 has through holes 152a, which permit the oil and the water removed by the urethane foam 150 to drop. Thus, the lower section in the case 131 functions as a collected liquid storage portion 154.

A heating device for evaporating water in the collected liquid by heating the stored collected liquid, which is a heater 155 in this embodiment, is arranged in the collected liquid storage portion 154. The heater 155 is inserted in the case 131 from an insertion hole 156 formed in the side face of the case 131. The heater 155 directly heats the collected liquid stored in the collected liquid storage portion 154. Heating of the heater 155 is controlled by a non-illustrated thermostat.

Figure 17:
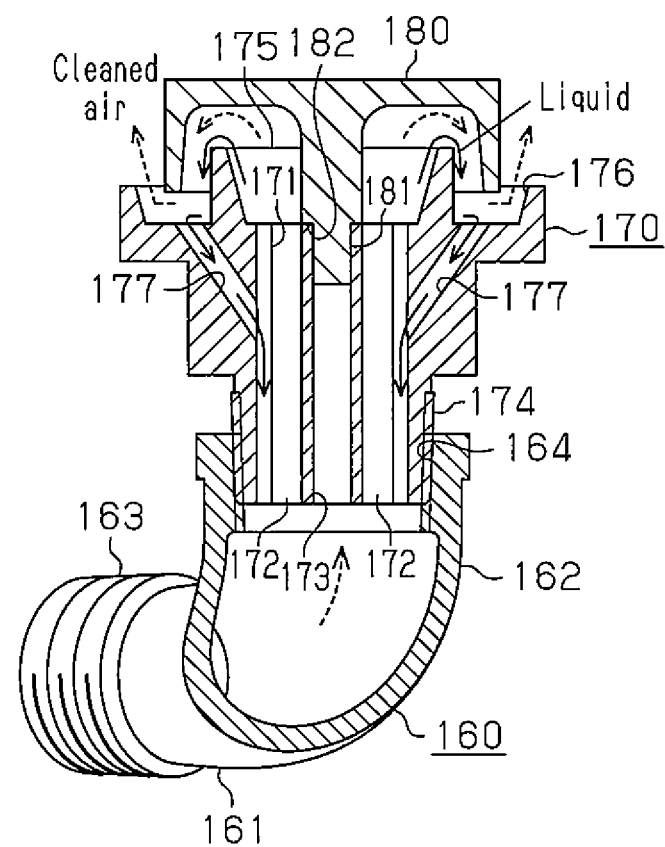
FIG. 17 is a cross-sectional view illustrating the internal structure of the elbow member and the drip preventing member of FIG. 16.

As shown in FIG. 16 and FIG. 17, the elbow member 160 includes a horizontal part 161, which extends in the horizontal direction, and a vertical part 162, which is continuous with the horizontal part 161 and extends in the vertical direction. An external thread portion 163, which is screwed to an internal thread portion 140a of the outlet 140, is formed at the proximal end of the elbow member 160. The external thread portion 163 of the elbow member 160 is formed such that tightening stops at a position where the distal end of the elbow member 160 faces upward when the external thread portion 163 is screwed to the internal thread portion 140a of the outlet 140. An internal thread portion 164, to which the drip preventing member 170 is screwed, is formed at the distal end of the elbow member 160. When the collected liquid flows into the elbow member 160, the vertical part 162 prevents the collected liquid from flowing to the outside.

A through hole 171, which connects the proximal end and the distal end of the drip preventing member 170, is formed inside the drip preventing member 170. Four division plates 172 are provided in the drip preventing member 170 to prevent large foreign matter from entering the passage and clogging the passage. The division plates 172 are formed to extend in the axial direction at equal intervals in the circumferential direction. A cylindrical portion 173 is formed at the center of the through hole 171 and at a position where the division plates 172 intersect one another. An external thread portion 174, which is screwed to the internal thread portion 164 of the elbow member 160, is formed at the proximal end of the drip preventing member 170. A drip pan 176, which receives liquid that drips from an opening portion 175, is formed on the side face of the opening portion 175 at the distal end of the drip preventing member 170 along the entire circumference. A return bore 177, which returns the liquid received by the drip pan 176 to the through hole 171, is formed at the bottom portion of the drip pan 176. The return bore 177 extends from the drip pan 176 to the through hole 171. Thus, the liquid that has dripped to the drip pan 176 returns to the elbow member 160 through the return bore 177.

A columnar insertion portion 181, which is inserted in the cylindrical portion 173 of the drip preventing member 170, projects from the inside of the cover 180. A step 182 is formed on the insertion portion 181. The step 182 determines the insertion position of the cover 180 with respect to the drip preventing member 170. The cover 180 covers the opening portion 175 of the drip preventing member 170. The outer diameter of the cover 180 is smaller than the inner diameter of the drip pan 176. Thus, the cleaned air that has passed through the drip preventing member 170 is discharged to the outside through the space between the opening portion 175 of the drip preventing member 170 and the inner surface of the cover 180.

Operation of the above-mentioned oil separator 103 will now be described.

As shown in FIG. 11, the purge air discharged from the air dryer 2 is introduced to the oil separator 103. The purge air is the air containing oil and water.

As shown in FIG. 13, the purge air introduced from the inlet 135 strikes the baffle plates 146, is introduced into the oil separator 103 along the baffle plates 146, and expands in the first expansion chamber 145.

As shown in FIG. 14, the air expanded in the first expansion chamber 145 enters the second expansion chamber 151 via the through holes 147b formed in the cover 147. The air that has expanded in the second expansion chamber 151 enters the third expansion chamber 159 via the through holes 149a of the upper base 149 of the accommodation member 148. At this time, the oil and the water that have struck the urethane foam 150 are separated from the air. The liquid that contains the water and the oil trapped by the urethane foam 150 moves through the urethane foam 150. The liquid reaches the upper surface of the support lid 152, drops from the through holes 152a of the support lid 152 into the collected liquid storage portion 154, and is stored in the collected liquid storage portion 154. The liquid stored in the collected liquid storage portion 154 enters the drain hose 134 through the drain outlet 133. The collected liquid stored in the collected liquid storage portion 154 is heated by the heater 155. This evaporates the water in the collected liquid.

When the distal end of the drain hose 134 is detached from the securing member 191, the atmospheric air flows into the securing member 191, and the liquid in the drain hose 134 is located at the same level as the collected liquid in the collected liquid storage portion 154. Thus, the amount of the collected liquid in the collected liquid storage portion 154 can be checked by visually checking the liquid in the drain hose 134.

As shown in FIG. 15, oil and water are separated from the air that has entered the third expansion chamber 159 from the through holes 149a of the upper base 149 of the accommodation member 148. The air then enters the case 131 from the through holes 148c on the side face of the accommodation member 148. The air that has entered the case 131 passes through the communication hole 147c of the cover 147 and the communication section 132a of the lid 132, flows into the elbow member 160 through the outlet 140, and is discharged to the atmosphere. Thus, the air that has entered the case 131 hardly contacts the collected liquid of the collected liquid storage portion 154, and is discharged from the outlet 140. The air that is discharged from the outlet 140 is cleaned air that does not contain oil.

When discharging the collected liquid stored in the collected liquid storage portion 154, the distal end of the drain hose 134 is detached from the one-touch coupler 192 by manipulating the one-touch coupler 192, and the distal end of the drain hose 134 is held lower than the surface of the collected liquid in the collected liquid storage portion 154. In this manner, the collected liquid is discharged from the collected liquid storage portion 154.

When cleaning inside the case 131 or replacing the impingement member, which is the urethane foam 150 in this embodiment, the bolts 136 are removed from the threaded bores 132c to dismount the case 131 and the cover 147 from the lid 132. The dismounted case 131 and the cover 147 can be cleaned. Furthermore, the screws 153, which secure the support lid 152 to the accommodation member 148, are removed to take out the urethane foam 150 from the accommodation member 148, and the urethane foam 150 is replaced. After replacement, the support lid 152 is secured to the accommodation member 148 with the screws 153, and the bolts 136 are tightened to the threaded bores 132c of the lid 132 so that the case 131 and the cover 147 are mounted to the lid 132.

The third embodiment has the following advantages.

(1) The inlet 135 and the outlet 140 are provided in the lid 132, and the purge air introduced into the case 131 through the inlet 135 moves vertically downward through the expansion chambers 145, 151, 159, and cleaned air is discharged from the outlet 140. The bolts 136 and the threaded bores 132c, which serve as the mounting and dismounting mechanism, allow the case 131 to be dismounted from and mounted to the lid 132. Thus, the housing is easily separated by dismounting the case 131 from the lid 132.

(2) The inlet 135 and the outlet 140 are formed on a horizontal surface of the lid 132. Since the inlet 135 and the outlet 140 are not formed in the case 131, no tubes are connected to the case 131. Thus, it is easy to dismount the case 131 from the lid 132. Also, since no tubes are connected to the upper surface or the bottom face of the lid 132 in the vertical direction, the vertical length is prevented from being increased.

(3) The heater 155 is inserted through the insertion hole 156, which is provided at the lower section of the case 131, and the heater 155 directly heats the collected liquid. Thus, the amount of collected liquid is reduced by evaporating the water contained in the collected liquid. This reduces the number of times the case 131 is dismounted from the lid 132, and extends the life of the mounting and dismounting mechanism. Furthermore, heat transfer from the heater 155 to the collected liquid is high, and the collected liquid is efficiently heated as compared to a case in which the collected liquid is indirectly heated.

Fourth Embodiment

An oil separator according to a fourth embodiment will now be described with reference to FIGS. 21 to 24.

An oil separator 203 is provided with a heating device 280. The heating device 280 heats the oil separator 203 by allowing the high-temperature compressed air supplied from the compressor 1 to pass along the outer circumference of the oil separator 203. That is, the compressed air of the compressor 1 is supplied to the air dryer 2 after flowing around the outer circumference of the oil separator 203. The temperature of the compressed air supplied from the compressor 1 is as high as approximately 160° C.

Figure 21:
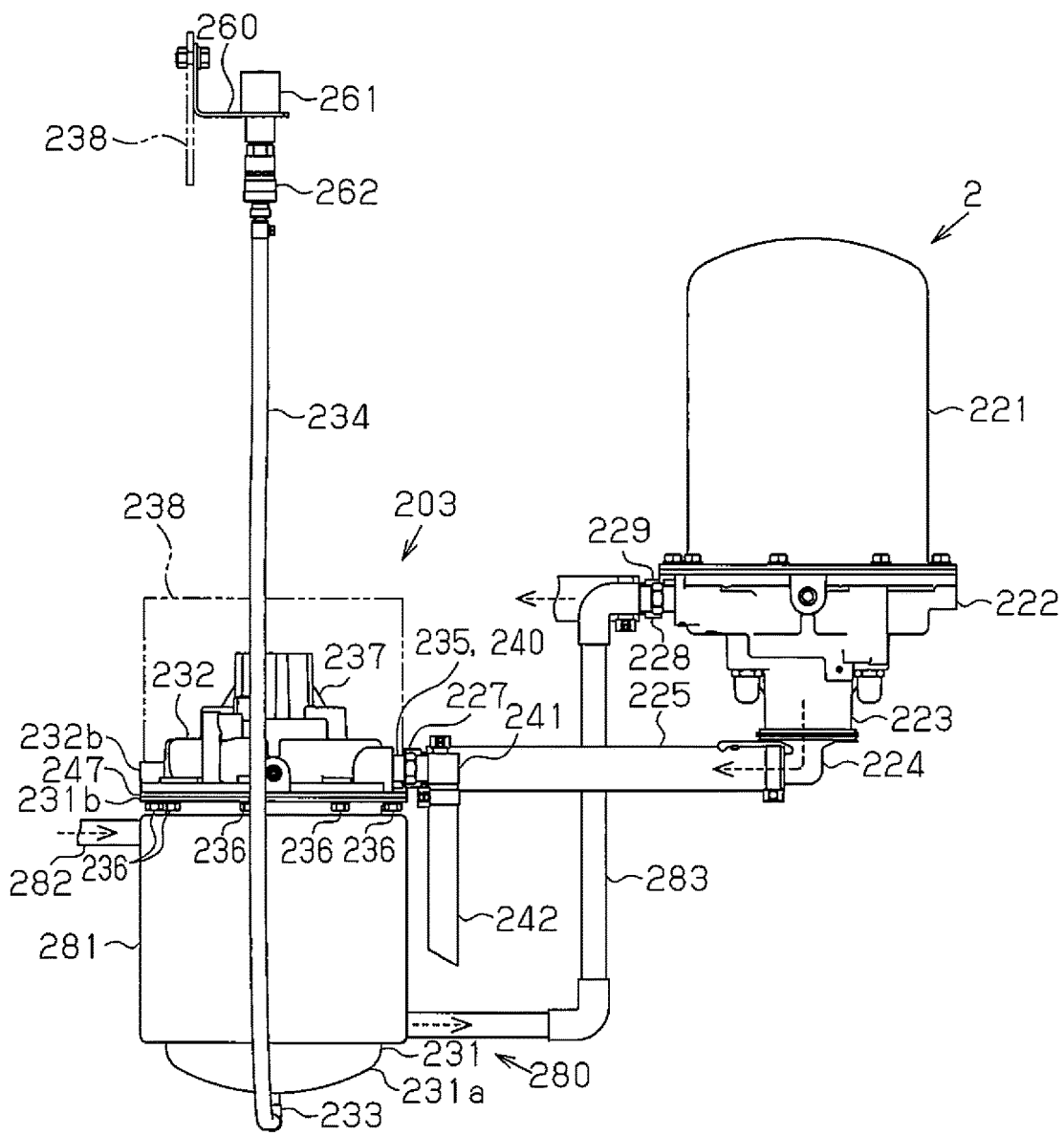
FIG. 21 is a view illustrating a mounting state of an oil separator according to a fourth embodiment of the present invention and a connection state of the oil separator and an air dryer.

As shown in FIG. 21, the air dryer 2 includes a cylindrical case 221 having a vertically upper end closed, and a support member 222, which closes the opening portion of the case 221 and supports the case 221. A purge air outlet 223, which discharges purge air during regeneration of a desiccant, is formed at the lower section of the support member 222. A purge air discharge cover 224, to which a connecting hose 225 is connected, is attached to the purge air outlet 223. The connecting hose 225 is connected to the oil separator 203. The support member 222 of the air dryer 2 is provided with an inlet 228, which introduces the compressed air compressed by the compressor 1, and an outlet 229, which discharges dried compressed air.

The oil separator 203 includes a cylindrical housing having a closed end and extending in the vertical direction, which is a case 231 in this embodiment, and a lid 232, which closes the opening portion of the case 231. A drain outlet 233 for discharging the stored collected liquid is provided at a bottom portion 231a of the case 231. A drain hose 234, which is used when removing the collected liquid, is connected to the drain outlet 233. The lid 232 has an inlet 235 for introducing the purge air from the air dryer 2 through the connecting hose 225, and an outlet 240 for discharging cleaned air from which oil is separated. The inlet 235 and the outlet 240 are formed separately. The inlet 235 and the connecting hose 225 are connected to each other by a coupling member 227.

A mounting member 237 is formed integrally with the lid 232 of the oil separator 203 to extend upright from the lid 232. The mounting member 237 is secured to a chassis 238 with bolts.

The distal end of the drain hose 234 is detachably mounted to a support member 260, which is secured to, for example, the chassis 238 of a vehicle. That is, a securing member 261 is secured to the support member 260. A one-touch coupler 262 is secured to the lower end of the securing member 261. The one-touch coupler 262 allows the distal end of the drain hose 234 to be attached to the securing member 261 by a single operation. The drain hose 234 is secured to the securing member 261 by inserting the distal end of the drain hose 234 to the one-touch coupler 262, and is detached from the securing member 261 by manipulating the one-touch coupler 262. The distal end of the drain hose 234 is attached to the securing member 261 to face vertically upward. The distal end of the drain hose 234 is located upward of the lid 232 of the oil separator 203. Thus, the collected liquid is prevented from leaking from the distal end of the drain hose 234.

A cylindrical jacket 281, which configures the heating device 280, is fitted to the outer circumference of the case 231 of the oil separator 203. The jacket 281 is detachable with respect to the case 231. An introduction connecting pipe 282, which is connected to the compressor 1 and introduces the compressed air from the compressor 1, is connected to the upper section of the side face of the jacket 281. A discharge connecting pipe 283, which is connected to the air dryer 2 and discharges the compressed air to the air dryer 2, is connected to the lower section of the side face of the jacket 281. The discharge connecting pipe 283 is connected to the inlet 228 of the air dryer 2. The heating device 280 draws the compressed air of the compressor 1 into the jacket 281 to heat the case 231. Furthermore, the heating device 280 transfers the heat quantity of the compressed air supplied from the compressor 1 to the case 231 via the jacket 281 so that the compressed air supplied from the compressor 1 is discharged to the air dryer 2 after being cooled. The temperature of the compressed air that has been cooled through the jacket 281 is approximately 60° C.

Figure 22:
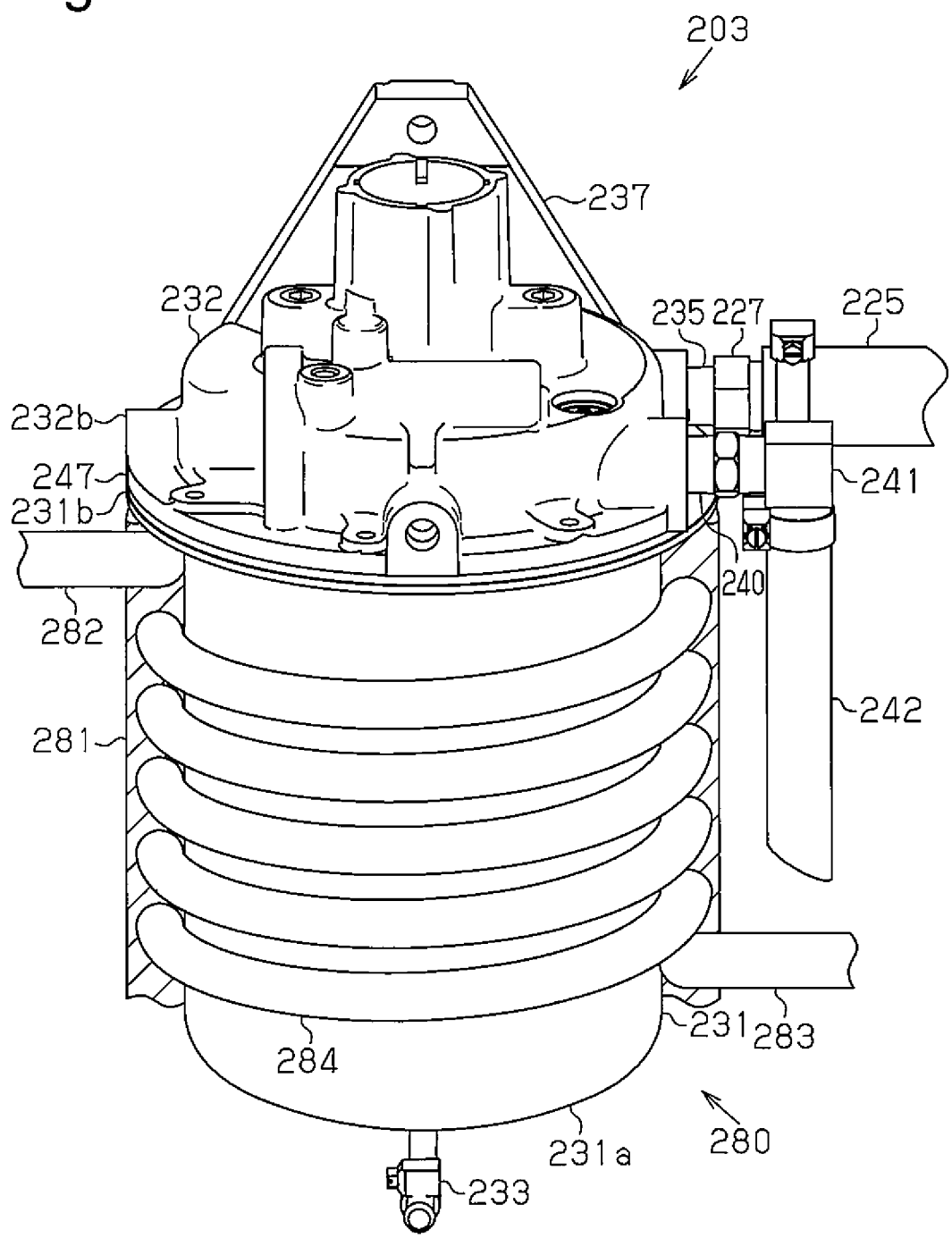
FIG. 22 is a partially cut away view illustrating the structure of the heating device of the oil separator of FIG. 21.

As shown in FIG. 22, the jacket 281 is provided with a guide pipe 284, which extends along the outer circumference of the case 231 in a spiral manner. The guide pipe 284 connects the introduction connecting pipe 282 to the discharge connecting pipe 283. The inlet 235 and the outlet 240 provided on the lid 232 are open toward the same direction (rightward in the drawing). The connecting hose 225 is connected to the inlet 235 via the coupling member 227. A discharge hose 242 is connected to the outlet 240 via a connecting member 241, which extends in the horizontal direction and bends vertical downward. That is, the coupling member 227 and the connecting member 241 are arranged next to each other. The distal end opening of the discharge hose 242 is formed such that the vertical length of the discharge hose 242 close to the case 231 is shorter than the length of the opposed portion, and the end surface of the distal end opening is inclined with respect to the horizontal direction. This facilitates discharging of the cleaned air from the discharge hose 242, and improves the waterproof performance.

Figure 23:
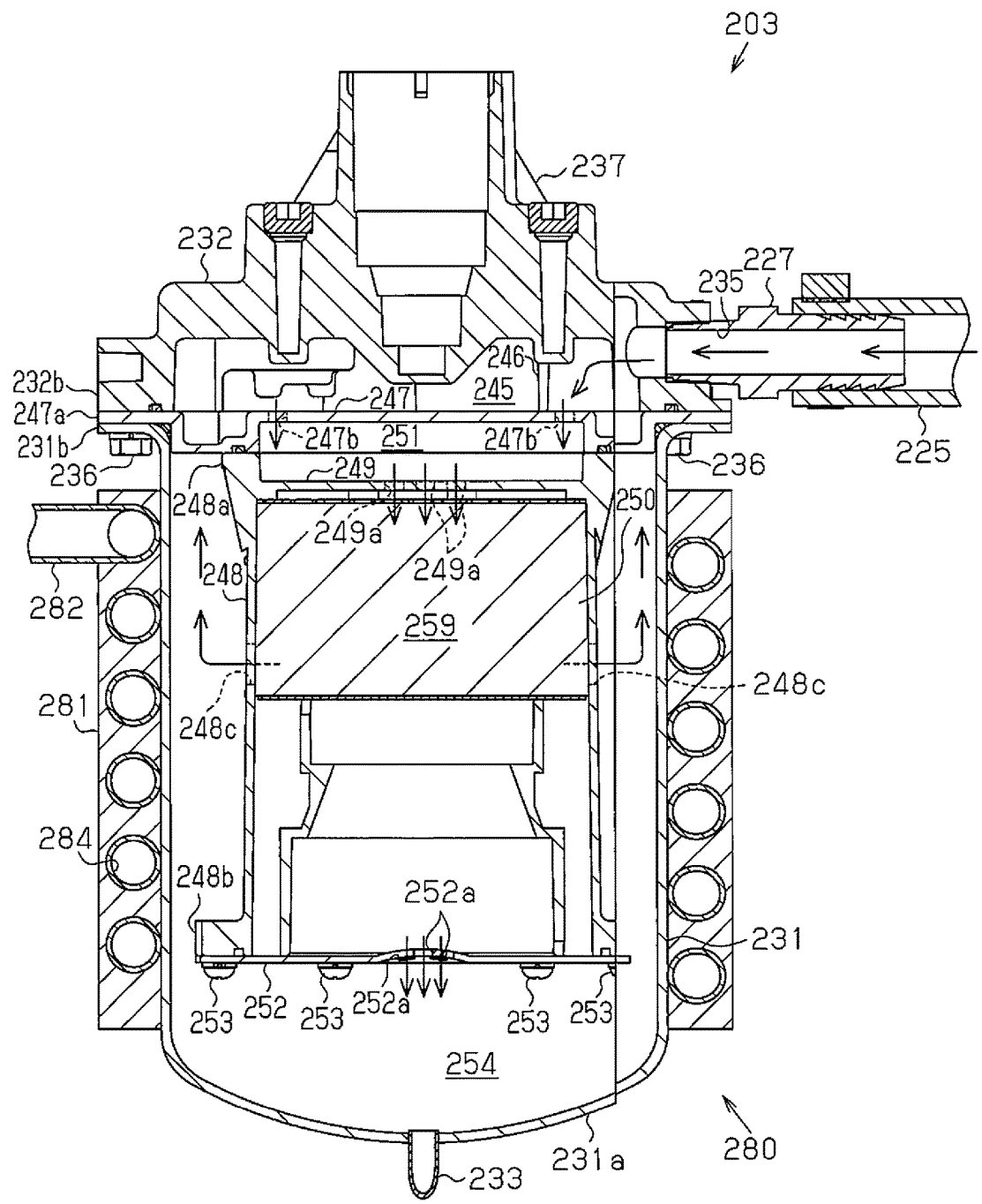
FIG. 23 is a cross-sectional view illustrating the internal structure of the oil separator of FIG. 22.

As shown in FIG. 23, the lid 232 is a cylinder having a vertically upper end closed. Two baffle plates 246 are provided on the inner wall of the lid 232 in the vicinity of the inlet 235 to be perpendicular to the flow direction of the purge air introduced from the inlet 235. The internal space of the lid 232 functions as a first expansion chamber 245, which expands the purge air introduced from the inlet 235. The lid 232 has a communication section 232a, which connects the inside of the case 231 to the outlet 240.

Figure 24:
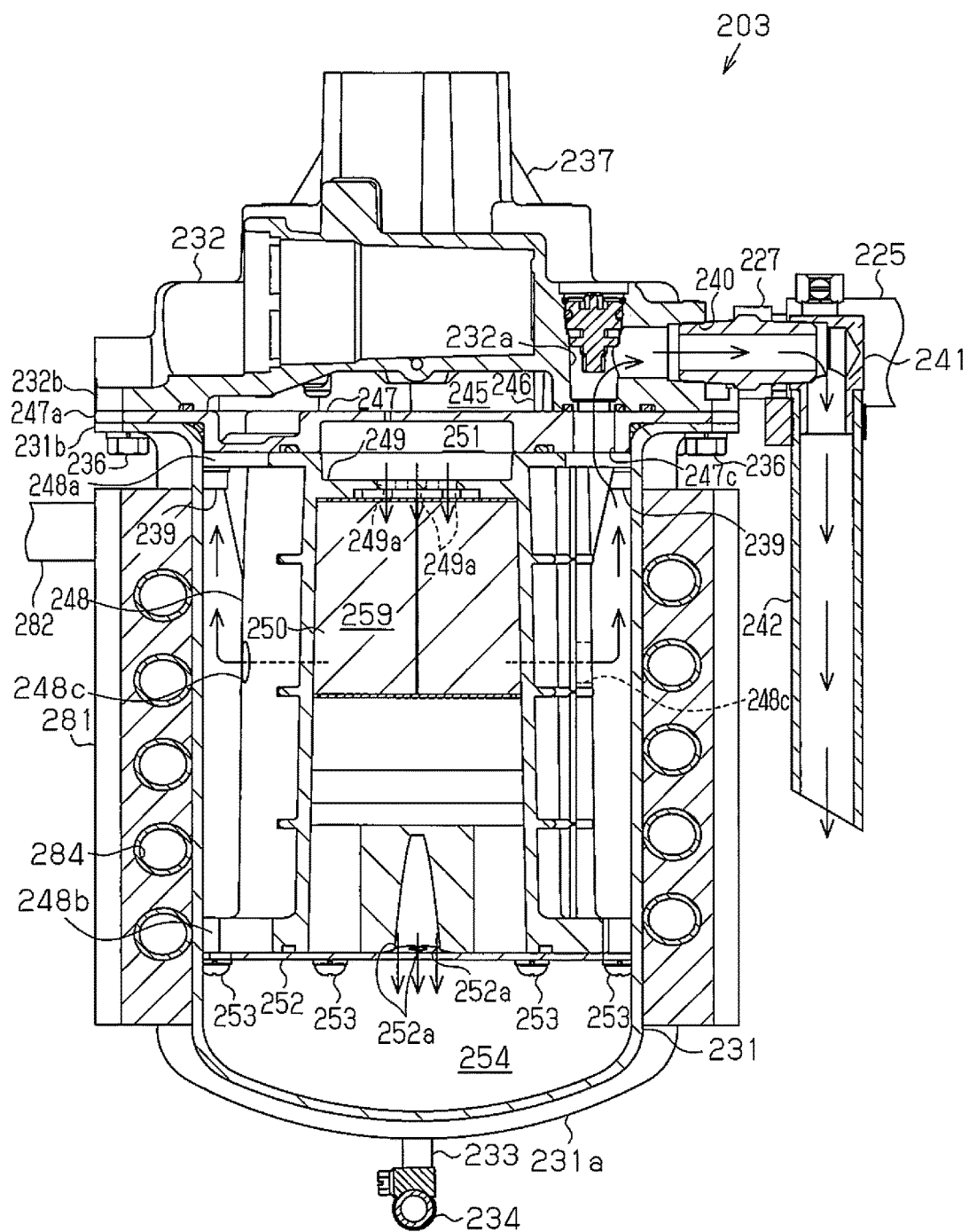
FIG. 24 is a cross-sectional view illustrating the internal structure of the oil separator of FIG. 22.

As shown in FIGS. 23 and 24, a disk-like cover 247, which closes the case 231 and the opening portion of the lid 232, is provided between the case 231 and the lid 232. The cover 247 and the case 231 are tightened to the lid 232 with bolts 236. That is, the bolts 236 are tightened to threaded bores formed in a flange portion 232b provided on the lid 232. Furthermore, the threaded portions of the bolts 236 extend through through-holes formed in a flange portion 231b provided on the case 231. The cover 247 has through holes through which the threaded portions of the bolts 236 extend. Thus, threaded portions of the bolts 236 extend through the through-holes of the flange portion 231b of the case 231 and the through-holes of a flange portion 247a of the cover 247. The bolts 236 are then screwed to the threaded bores of the flange portion 232b of the lid 232 so that the lid 232, the cover 247, and the case 231 are tightened together. The cover 247 has a communication hole 247c, which connects the inside of the case 231 to the outlet 240.

The space formed by the lid 232 and the cover 247 functions as the first expansion chamber 245. A cylindrical accommodation member 248 having a vertically upper end closed is secured to the cover 247 with bolts 239. The accommodation member 248 accommodates a urethane foam 250 such as a sponge. The urethane foam 250 functions as an impingement member. A flange portion 248a is formed at the upper edge of the accommodation member 248 and a flange portion 248b is formed at the lower edge of the accommodation member 248. The bolts 239 extend through the flange portion 248a formed at the upper edge of the accommodation member 248 so that the accommodation member 248 is tightened to the cover 247. The space formed by the cover 247 and upper surface of the accommodation member 248 functions as a second expansion chamber 251. The cover 247 has through holes 247b, which connect the first expansion chamber 245 to the second expansion chamber 251. Through holes 249a are formed at the center portion of an upper base 249 of the accommodation member 248. The through holes 247b of the cover 247 and the through holes 249a of the upper base 249 of the accommodation member 248 are formed at positions that are not opposed to each another. Through holes 248c are formed at the lower end of the side face of the accommodation member 248 to be spaced apart in the radial direction.

A disk-like support lid 252 is secured to the flange portion 248b, which is formed at the lower edge of the accommodation member 248, with screws 253. The support lid 252 supports the urethane foam 250 accommodated in the accommodation member 248. The inner diameter of the support lid 252 is substantially the same as the inner diameter of the case 231. The space formed by the upper base 249 of the accommodation member 248 and the support lid 252 functions as a third expansion chamber 259. The support lid 252 has through holes 252a, which permit the oil and the water removed by the urethane foam 250 to drop. Thus, the lower section in the case 231 functions as a collected liquid storage portion 254.

Operation of the oil separator 203 configured as described above will now be described.

As shown in FIG. 21, the compressed air supplied from the compressor 1 via the introduction connecting pipe 282 is introduced to the guide pipe 284 in the jacket 281 of the heating device 280, and passes through the guide pipe 284 to heat the case 231 via the jacket 281. When having been passed through the jacket 281, the compressed air is cooled to be cooler than when being introduced to the jacket 281. The compressed air discharged from the jacket 281 is introduced into the air dryer 2 via the discharge connecting pipe 283. The compressed air introduced to the air dryer 2 is dried, and stored in a non-illustrated air tank. The purge air is introduced to the oil separator 203 through the purge air outlet 223 when unloading to regenerate the desiccant. The purge air contains oil and water.

As shown in FIG. 23, the purge air introduced from the inlet 235 strikes the baffle plates 246, is introduced into the oil separator 203 along the baffle plates 246, and expands in the first expansion chamber 245. The air that has expanded in the first expansion chamber 245 enters the second expansion chamber 251 via the through holes 247b formed in the cover 247. The air that has expanded in the second expansion chamber 251 enters the third expansion chamber 259 via the through holes 249a of the upper base 249 of the accommodation member 248. At this time, the oil and the water that have struck the urethane foam 250 are separated from the air. The liquid containing the water and the oil trapped by the urethane foam 250 moves through the urethane foam 250 and reaches the upper surface of the support lid 252. The liquid drops from the through holes 252a of the support lid 252 to the collected liquid storage portion 254, and is stored in the collected liquid storage portion 254. The liquid that has stored in the collected liquid storage portion 254 enters the drain hose 234 from the drain outlet 233.

As shown in FIG. 24, the oil and the water are separated from the air that has entered the accommodation member 248 from the through holes 249a in the upper base 249 of the accommodation member 248. The air then enters the case 231 from the through holes 248c on the side face of the accommodation member 248. The air that has entered the case 231 passes through the communication hole 247c of the cover 247 and the communication section 232a of the lid 232, flows through the outlet 240 and the connecting member 241 into the discharge hose 242 to be discharged to the atmosphere. Thus, the air that has entered the case 231 hardly contacts the collected liquid in the collected liquid storage portion 254, and is discharged from the outlet 240. The air that is discharged from the outlet 240 is cleaned air that does not contain oil.

When discharging the collected liquid stored in the collected liquid storage portion 254, the distal end of the drain hose 234 is detached from the one-touch coupler 262 by manipulating the one-touch coupler 262, and the distal end of the drain hose 234 is held lower than the surface of the collected liquid in the collected liquid storage portion 254. In this manner, the collected liquid is discharged from the collected liquid storage portion 254.

In the present embodiment, the high-temperature compressed air supplied from the compressor 1 is drawn into the jacket 281, which configures the heating device 280, and the drawn-in compressed air heats the case 231 of the oil separator 3. This prevents freezing of the water in the case 231 of the oil separator 203 in, for example, cold climate areas.

The fourth embodiment provides the following advantages.

(1) Since the heating device 280 for heating the case 231 is provided, the water is prevented from freezing in the case 231 in, for example, cold climate areas by heating the case 231 with the heating device 280.

(2) Since the heating device 280 is provided on the outer circumference of the case 231, there is no need to employ a complicated structure, and installation of the heating device 280 to the oil separator 203 is easy.

(3) Since the heating device 280 heats the case 231 with the compressed air heated by compression heat of the compressor 1, there is no need to generate warm air. Since it is also unnecessary to separately draw in warm air, the heating device is easily provided by drawing in the compressed air to be supplied to the air dryer 2.

(4) The compressed air is supplied to the air dryer 2 via the heating device 280. Since the compressed air supplied from the compressor 1 is appropriately cooled by the heating device 280, it is unnecessary to separately cool the compressed air to a temperature that optimizes the performance of the air dryer 2.

Fifth Embodiment

An oil separator according to a fifth embodiment will now be described with reference to FIGS. 27 to 30.

Figure 28:
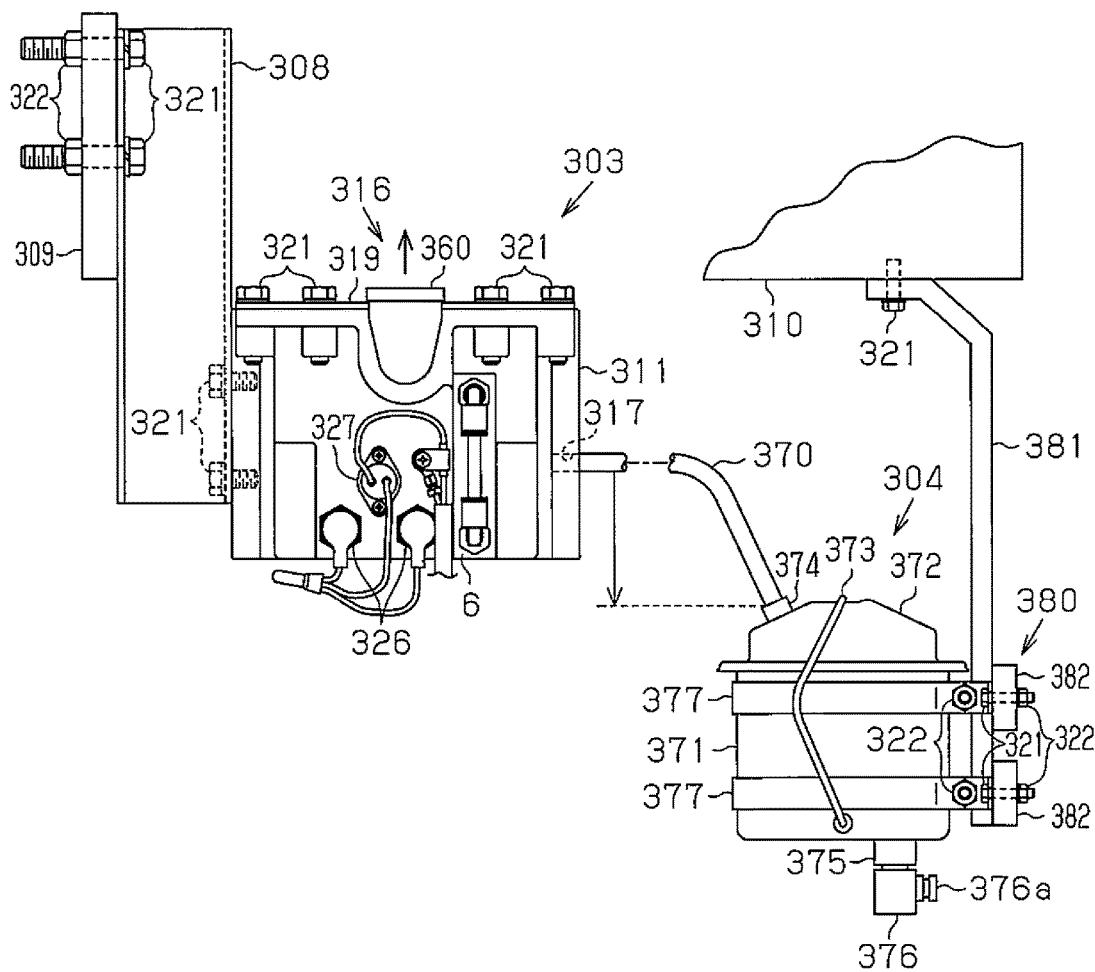
FIG. 28 is a front view illustrating the oil separator main body and the additional tank of FIG. 27.

As shown in FIG. 28, an oil separator main body 303 is secured to a frame 309 such as a ladder frame with bolts 321 and nuts 322 via a pair of plate-like mounting members 308. The oil separator main body 303 and an additional tank 304 are connected by a hose 370. One end of the hose 370 is connected to a drain outlet 317 of the oil separator main body 303.

Figure 29:
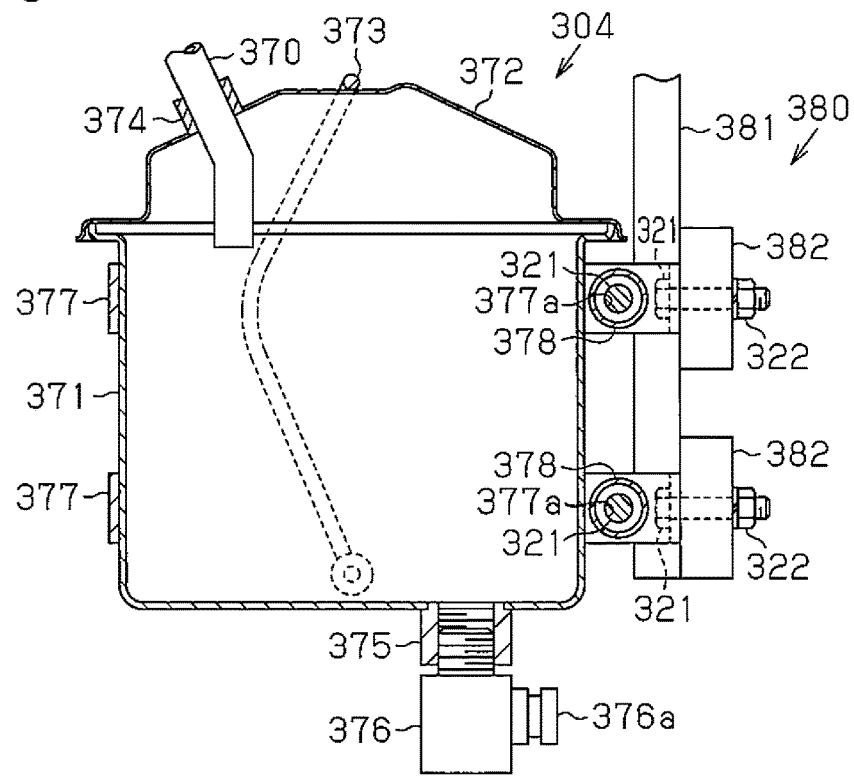
FIG. 29 is a cross-sectional view illustrating the additional tank of FIG. 28.
Figure 30:
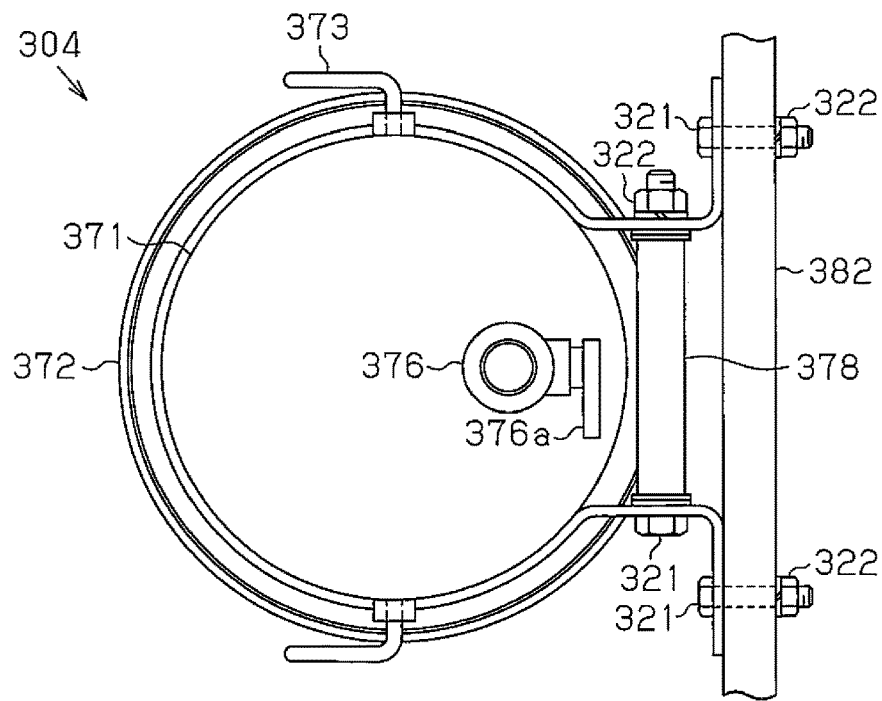
FIG. 30 is a bottom view illustrating the additional tank of FIG. 28.

As shown in FIGS. 28 and 29, the additional tank 304 includes a cylindrical main container 371, which has a closed end and accommodates a collected liquid, and a lid 372, which closes the opening portion of the main container 371. A handgrip 373 for lifting the additional tank 304 is attached to the main container 371. The lid 372 has a columnar inlet port 374, which communicates with the inside of the lid 372. The other end of the hose 370 is connected to the inlet port 374. The inlet port 374 functions as an inlet for supplying the collected liquid to the additional tank 304. The inlet port 374 is located lower than the drain outlet 317. Thus, when the collected liquid stored in the collected liquid storage portion 345 of the oil separator main body 303 reaches the drain outlet 317, the collected liquid passes through the drain outlet 317 and the hose 370 naturally by gravity and is conveyed to the additional tank 304.

A columnar discharge port 375, which communicates with the inside of the main container 371, is provided on the underside of the main container 371. A ball cock 376, which opens and closes a communication section, is attached to the discharge port 375. When a lever 376a is manipulated, the ball cock 376 opens or closes the communication section to discharge or stop the collected liquid.

Two Ω-shaped mounting members 377 for mounting to the vehicle body are tightly secured to the main container 371 of the additional tank 304. A cylindrical spacer 378 is attached to the opening portion of each mounting member 377. A bolt 321 is inserted in each spacer 378 and mounting bores 377a formed in each mounting member 377, and is tightly secured with a nut 322. The spacer 378 defines the tightening amount of the nut 322 with respect to the bolt 321.

As shown in FIG. 28, the mounting members 377 are secured to an underside prevention member mounted on a vehicle body 310 of a truck, which is a side guard 380 in this embodiment. The side guard 380 prevents an object from being caught in a space between tires beneath the vehicle body. The side guard 380 includes rectangular stays 381, which are secured to the vehicle body 310 with bolts 321 and hang from the vehicle body 310, and rectangular bars 382, which are welded to the stays 381 and extend in the extending direction of the vehicle body 310. The mounting members 377 mounted on the additional tank 304 are secured to the bars 382 of the side guard 380 with bolts 321 and nuts 322.

Operation of the oil separator configured as described above will now be described.

As shown in FIG. 28, the collected liquid stored in the housing 311 is heated by heaters 326 to evaporate the water in the collected liquid. If the stored collected liquid reaches the drain outlet 317, the collected liquid is discharged from the drain outlet 317 naturally by gravity, and sent to the additional tank 304 through the hose 370.

When recovering the collected liquid stored in the additional tank 304, an operator reaches out to manipulate the lever 376a of the ball cock 376 to open the ball cock 376 so that the collected liquid is discharged. The collected liquid can be recovered by placing, for example, a bucket below the additional tank 304.

Thus, since the amount of oil that can be separated and recovered through the oil separator main body 303 is increased by the capacity of the additional tank 304, the number of times (frequency) the operator needs recover stored liquid is reduced. Furthermore, since the additional tank 304 is mounted on the side guard 380 such that the inlet port 374 is located lower than the drain outlet 317 of the oil separator main body 303, the collected liquid is conveyed to the additional tank 304 from the collected liquid storage portion 345 naturally by gravity. Thus, the operator can easily recover the collected liquid.

The above-described embodiment has the following advantages.

(1) Since the additional tank 304 is provided, the separated collected liquid is stored separately from the housing 311. Thus, the total amount of the collected liquid that can be stored is increased, and thus the number of times (frequency) the operator needs to recover the stored collected liquid is reduced.

(2) The additional tank 304 is mounted on the side guard 380 of the vehicle. Since the additional tank 304 is located at a position where an operator can reach, the recovering operation of the collected liquid stored in the additional tank 304 is easy.

(3) Since the inlet port 374 of the additional tank 304 is located lower than the drain outlet 317, the collected liquid stored in the housing 311 is naturally conveyed by gravity. Thus, only by providing the additional tank 304 and connecting the housing 311 with the additional tank 304, the collected liquid is conveyed to the additional tank 304.

The above described embodiments may be modified as follows.

In the first and second embodiments, the sealing sheet 20 is provided between the opening portion 18 of the housing 4 and the lid 19, but the sealing sheet 20 may be omitted. It is desirable that the sealing between the opening portion 18 of the housing 4 and the lid 19 be maintained.

In the first and second embodiments, the baffle plates 34b, 35b, which extend to be perpendicular to the upright plates 34a, 35a, are provided. However, as long as the extremely narrow section 36 is maintained, the baffle plates 34b, 35b do not necessarily have to be formed to be perpendicular to the upright plates 34a, 35a.

In the first and second embodiments, the extremely narrow section 36 configured by the pair of baffle plates 34b, 35b is provided. However, an extremely narrow section formed by multiple pairs of baffle plates may be provided.

In the first and second embodiments, the communication hole 33 is formed at the lower section of the partition wall 30. However, if the drain outlet 17 is formed in each of the expansion chambers 31, 32, the communication hole 33 of the partition wall 30 may be omitted.

In the first and second embodiments, the lid 19 restricts the movement of the impingement plates 34, 35, the partition wall 30, the urethane foam 38, and the crushed aluminum member 39. However, as long as the impingement plates 34, 35, the partition wall 30, the urethane foam 38, and the crushed aluminum member 39 are secured, the lid 19 does not necessarily have to restrict their movement.

In the first and second embodiments, the crushed aluminum member 39 is provided in the secondary expansion chamber 32, but the urethane foam 38 may be provided instead of the crushed aluminum member 39.

In the first and second embodiments, members are arranged in the housing 4 in the order of the urethane foam 38, the impingement plates 34, 35, the partition wall 30 (the orifice hole 30a), the impingement plates 34, 35, and the crushed aluminum member 39. However, the arrangement of the members may be changed, some of the members may be omitted, some of the members may be increased, or a member may be changed depending on the amount of oil and water discharged from the air dryer 2 (the compressor 1).

In the first and second embodiments, providing the liquid communication holes 46 at positions where the urethane foam 38 and the crushed aluminum member 39 contact the liquid communication portion 45 promotes dropping of the collected liquid, and prevents the collected liquid from being raised up to the expansion chambers 31, 32.

In the first and second embodiments, the expansion chambers 31, 32 are arranged next to each other in the horizontal direction, but may be arranged next to each other in the vertical direction.

In the first and second embodiments, the inlet 7 is formed in the front side 5, and the outlet 8 is formed in the rear side 6. However, if there is a sufficient space in the vertical direction, the inlet 7 and the outlet 8 may be formed in the lid 19 on the top face or the opening portion 16.

In the first and second embodiments, the mounting and dismounting mechanism of the housing 4 and the collected liquid storage portion 50 includes the bolts 21 and the nuts 22. However, other structures such as an engagement structure may be employed.

In the first and second embodiments, the mounting and dismounting mechanism of the housing 4 and the liquid communication portion 45 is a fitting structure. However, other structures such as an engagement structure may be employed.

Figure 9:
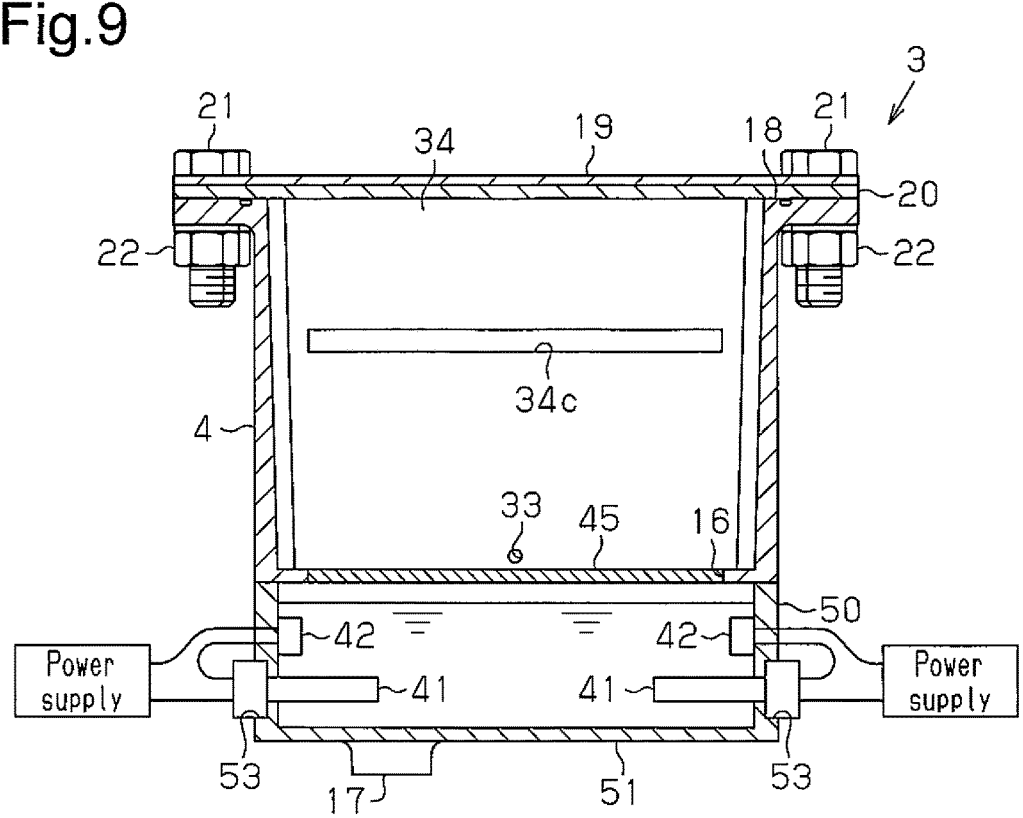
FIG. 9 is a transverse cross-sectional view illustrating the internal structure of an oil separator according to a modification.

In the first and second embodiments, the heaters 41 heat the collected liquid storage portion 50. However, the heaters 41 may directly heat the collected liquid stored in the collected liquid storage portion 50. For example, as shown in FIG. 9, insertion holes 53 through which the heaters 41 are inserted are formed in the side face of the collected liquid storage portion 50, and the heaters 41 are inserted through the insertion holes 53. The heaters 41 directly heat the stored collected liquid. Furthermore, the thermostats 42 are located on the inner wall of the collected liquid storage portion 50 to perform accurate temperature control. In this case, heat transfer from the heaters 41 to the collected liquid is high, and the collected liquid is efficiently heated as compared to the case in which the collected liquid is indirectly heated.

In the configuration of the first and second embodiments, the collected liquid storage portion 50 may be omitted and the collected liquid may be stored in the housing 4. In this case, the heaters 41 are provided in the ribs 40 of the housing 4.

In the first embodiment, the heaters 41 are provided in the ribs 52 (40), but the heaters 41 may be provided at positions other than the ribs 52 (40).

In the configuration of the first and second embodiments, the number of the heaters 41 may be changed as required.

In the first and second embodiments, the size, or the capacity, of the primary expansion chamber 31 and the secondary expansion chamber 32 is substantially the same. However, the capacity of the secondary expansion chamber 32 may be greater than the capacity of the primary expansion chamber 31. In this case, the saturated vapor pressure in the secondary expansion chamber 32 is further reduced, allowing the oil and the water to easily condense. This increases the mass of particles of the oil and the water, allowing them to easily strike the impingement plate. Thus, the secondary expansion chamber 32 stores more oil and water separated from the air than the primary expansion chamber 31.

Figure 10:
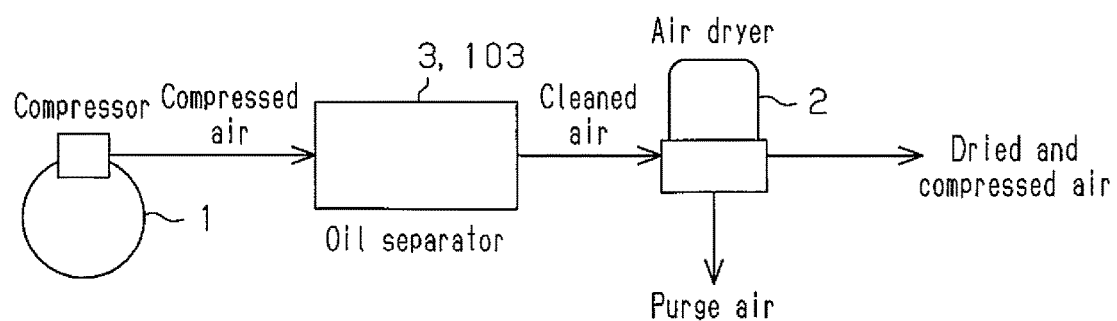
FIG. 10 is a block diagram illustrating an installation position of an oil separator according to a modification in an air system.

In the first and second embodiments, the oil separator 3 is provided in the exhaust system of the air dryer 2, which is downstream of the compressor 1 of the air system. However, as shown in FIG. 10, the oil separator 3 may be provided downstream of the compressor 1 of the air system and upstream of the air dryer 2. In this case, oil is separated from the air containing lubricant in the compressor 1, and cleaned air is supplied to the air dryer 2. Thus, the desiccant in the air dryer 2 is prevented from being deteriorated due to the oil.

In the first and second embodiments, the oil separator 3 is provided in the air system including the air dryer 2 in a vehicle such as trucks, buses, and construction machines. However, the oil separator 3 may be used in any situation as long as it is for use in separating oil from air containing oil and water. For example, the oil separator may clean exhaust gas to the atmosphere from an air dryer that dries compressed air in, for example, a plant.

Figure 18:
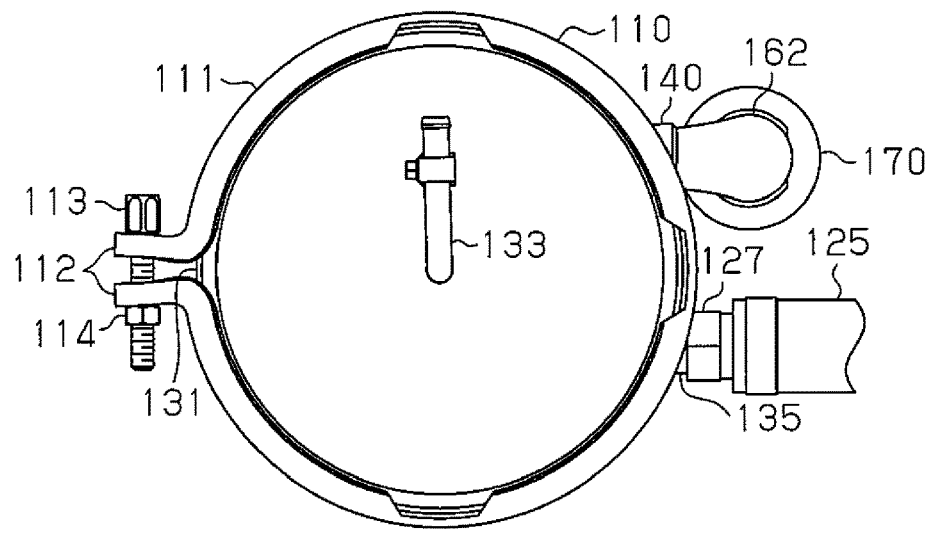
FIG. 18 is a bottom view illustrating a mounting and dismounting mechanism of an oil separator according to a modification.
Figure 19:
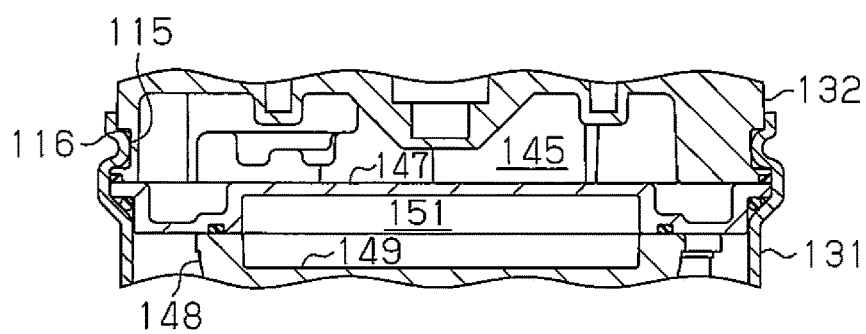
FIG. 19 is a cross-sectional view illustrating the mounting and dismounting mechanism the oil separator according to the modification.

In the third embodiment, as the mounting and dismounting mechanism, the bolts 136 are tightened to the threaded bores 132c. However, other mounting and dismounting mechanisms may be employed. For example, as shown in FIG. 18, a clamp ring 110 may be employed as the mounting and dismounting mechanism. The clamp ring 110 sandwiches the flange portion 132b of the lid 132 and the flange portion 131b of the case 131 and tightens radially inward. The clamp ring 110 includes a ring 111, which has a U-shaped cross-section and sandwiches the flange portions 132b, 131b, a bolt 113, which tightens tightening portions 112 of the ring 111, and a nut 114. If the clamp ring 110 is employed, the case 131 is easily mounted and dismounted by only turning the bolt 113. Also, as shown in FIG. 19, a recess-projection fitting structure may be employed as the mounting and dismounting mechanism. Instead of the flange portion 131b of the case 131, a projection 115, which projects inward of the case 131, is provided in the circumferential direction, and instead of the flange portion 132b of the lid 132, a recess 116 is provided. The case 131 is pressed toward the lid 132 so that the projection 115 of the case 131 is fitted to the recess 116 of the lid 132. The recess may be provided in the case 131, and the projection may be provided on the lid 132. If the recess-projection fitting is employed, the case 131 is mounted on the lid 132 only by fitting. Thus, the case 131 is easily mounted and dismounted. Furthermore, a locking screw may be provided to prevent rotation of the case 131 with respect to the lid 132.

Figure 20:
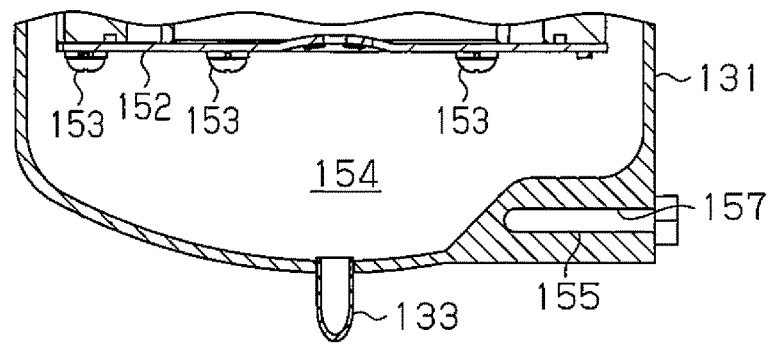
FIG. 20 is a cross-sectional view illustrating the structure of the lower part of the oil separator according to a modification.

In the third embodiment, the collected liquid is directly heated by inserting the heater 155 through the insertion hole 156 into the collected liquid storage portion 154. However, as shown in FIG. 20, an accommodation portion 157, which accommodates the heater 155, may be formed in the case 131, and the case 131 may be heated. In this case, the water contained in the collected liquid is evaporated, and the amount of collected liquid is reduced. This reduces the number of times the case is removed from the lid, and thus extends the life of the mounting and dismounting mechanism. Also, since the heater 155 does not contact the collected liquid, the heater is prevented from being deteriorated due to the collected liquid.

In the third embodiment, the inlet 135 and the outlet 140 are respectively provided on a horizontal surface of the lid 132, but the inlet 135 and the outlet 140 may be provided on the surface facing in the vertical direction such as an upper section of the lid 132.

In the third embodiment, the drain hose 134 is connected to the drain outlet 133 of the case 131. However, the drain hose 134 may be omitted, and the collected liquid may be directly discharged from the drain outlet 133. In this case, the drain outlet 133 is provided with a collected liquid flow prevention member.

In the third embodiment, the first expansion chamber 145, the second expansion chamber 151, and the third expansion chamber 159 are provided in the oil separator 103. However, at least one of the first expansion chamber 145, the second expansion chamber 151, and the third expansion chamber 159 may be employed.

In the third embodiment, the drain hose 134 may be calibrated.

In the third embodiment, a member such as a nonwoven fabric filter may be arranged upstream or downstream of the urethane foam 150, or in the expansion chambers 145, 151. In this case, the removal rate of the oil component is increased. Furthermore, the urethane foam 150 such as a sponge or a member such as a nonwoven fabric filter may be charged with static electricity. The members can be charged with static electricity by a method such as utilizing the flow of dried air from the dryer. Also, the urethane foam 150 such as a sponge and the member such as a nonwoven fabric filter may be formed of material that is electrically charged from the beginning. In this case, the removal rate of the oil component is further increased.

In the third embodiment, the urethane foam 150 is employed as the impingement member, but other members such as a crushed aluminum member may be employed. Furthermore, instead of the expansion chamber having the impingement member, just an expansion chamber without the impingement member may be employed.

In the fourth embodiment, the jacket 281 is preferably a heat insulating material.

In the fourth embodiment, the compressed air supplied from the compressor 1 is supplied to the air dryer 2 via the jacket 281 of the heating device 280. However, only some of the compressed air supplied from the compressor 1 may flow via the jacket 281 of the heating device 280.

Figure 25:
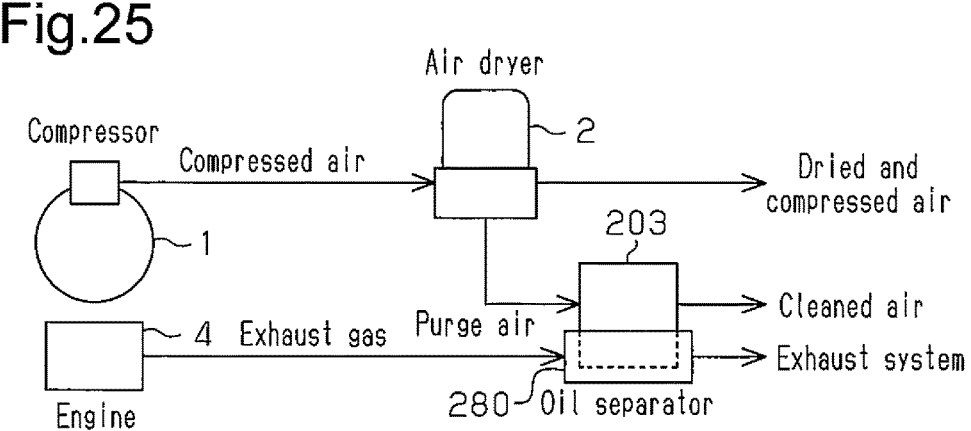
FIG. 25 is a block diagram illustrating an installation position of an oil separator according to a modification in an air system.

In the fourth embodiment, high-temperature compressed air supplied from the compressor 1 is drawn into the jacket 281 of the heating device 280 to heat the case 231. However, exhaust gas discharged from an internal combustion engine may be supplied to the heating device 280. That is, as shown in FIG. 25, high-temperature exhaust gas discharged from the internal combustion engine, which is an engine 4, is supplied to the heating device 280. The exhaust gas supplied to the heating device 280 from the engine 4 is discharged to the exhaust system of the internal combustion engine.

In the fourth embodiment, the case 231 and the jacket 281 may be integrally formed.

Figure 26:
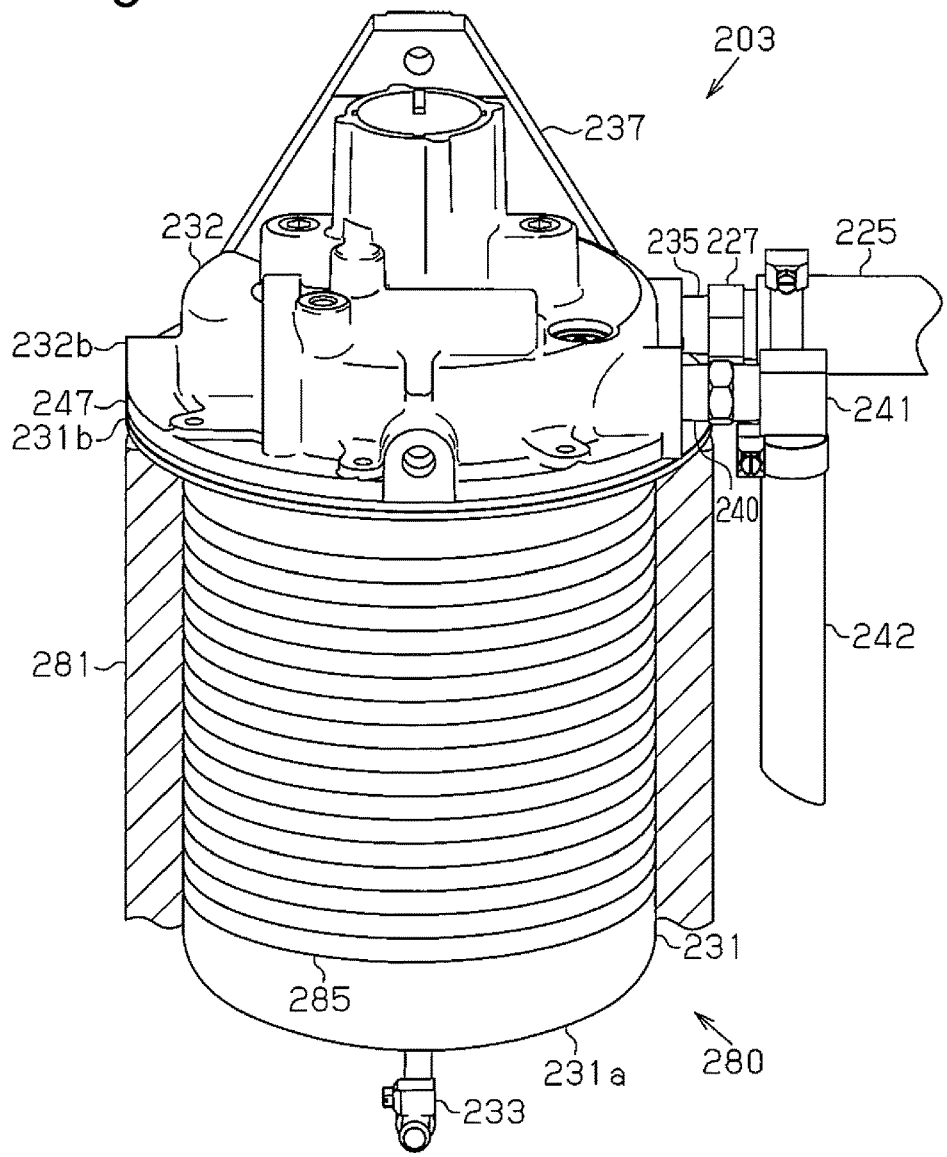
FIG. 26 is a partially cut away view illustrating the structure of the heating device of the oil separator according to a modification.
Figure 27:
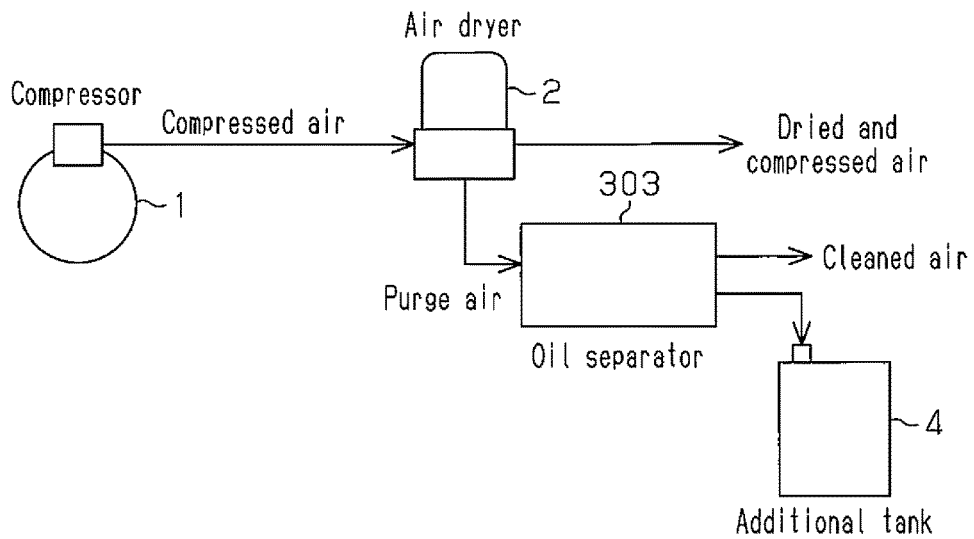
FIG. 27 is a block diagram illustrating an installation position of an oil separator in an air system according to a fifth embodiment of the present invention.

In the fourth embodiment, the compressed air of the compressor 1 or the exhaust gas of the engine 204 is supplied to the heating device 280 to heat the case 231. However, the case 231 may be heated by electric heating without relying on warm air. That is, as shown in FIG. 26, an electric heater, which is an electrically-heated wire 285 in this modification, may be wound around the case 231 and covered with the jacket 281 to heat the case 231. In this case, the oil separator 203 can be heated even when the vehicle is not driven.

In the fourth embodiment, the outer circumference of the case 231 is heated by the heating device 280, but the heating device may be provided in the case 231. For example, a guide pipe through which compressed air of the compressor 1 passes is provided in the case 231. Exhaust gas of the engine 204 may be allowed to pass through the guide pipe.

In the fourth embodiment, the water contained in the collected liquid stored in the collected liquid storage portion 254 may be evaporated by heating means (heating device) to reduce the amount of the collected liquid. In this case, since the time period required for the collected liquid to be stored to the capacity is extended, the discharging interval of the collected liquid is extended, and the burden of maintenance is reduced.

In the fourth embodiment, the inlet 235 of the oil separator 203 is located upper than the connection port of the purge air discharge cover 224 in the vertical direction. However, if it is unnecessary to limit the height of the air dryer 2 and the oil separator 203 in the vertical direction, the inlet 235 of the oil separator 203 may be located lower than the connection port of the purge air discharge cover 224 in the vertical direction.

In the fourth embodiment, the distal end of the drain hose 234 is located upward of the lid 232 of the oil separator 203. However, as long as the collected liquid is prevented from leaking from the distal end of the drain hose 234, the distal end of the drain hose 234 may be located lower than the lid 232 of the oil separator 203.

In the fourth embodiment, the drain hose 234 is connected to the drain outlet 233 of the case 231. However, the drain hose 234 may be omitted, and a cock may be provided on the drain outlet 233 so that the collected liquid is directly discharged from the drain outlet 233.

In the fourth embodiment, the first expansion chamber 245, the second expansion chamber 251, and the third expansion chamber 259 are provided in the oil separator 203. However, at least one of the first expansion chamber 245, the second expansion chamber 251, and the third expansion chamber 259 may be provided. Alternatively, four or more expansion chambers may be provided.

In the fourth embodiment, a member such as a nonwoven fabric filter may be provided upstream or downstream of the urethane foam 250, or in the expansion chambers 245, 251. In this case, the removal rate of the oil component is increased. Furthermore, the urethane foam 250 such as a sponge or a member such as a nonwoven fabric filter may be charged with static electricity. The members can be charged with static electricity by a method such as utilizing the flow of dried air from the dryer. Also, the urethane foam 250 such as a sponge and the member such as a nonwoven fabric filter may be formed of material that is electrically charged from the beginning. In this case, the removal rate of the oil component is further increased.

In the fourth embodiment, the urethane foam 250 is employed as the impingement member, but other members such as a crushed aluminum member may be employed. Furthermore, instead of the expansion chamber having the impingement member, just an expansion chamber without the impingement member may be employed.

In the fifth embodiment, the additional tank 304 is mounted on the underride prevention member, which is the side guard 380 in the fifth embodiment. However, the additional tank 304 does not necessarily have to be mounted on the underride prevention member, but may be mounted on other members such as a side member or a ladder frame.

In the configuration of the fifth embodiment, an observation window for checking the volume of the collected liquid may be provided in the main container 371 of the additional tank 304. In this case, the amount of the collected liquid stored in the additional tank 304 can be visually checked.

In the configuration of the fifth embodiment, the hose 370 may be formed of a transparent material. In this case, an operator can check whether the collected liquid is stored in the additional tank 304 by an amount greater than or equal to the capacity.

In the fifth embodiment, the structure in the housing 311 of the oil separator main body 303 may be changed as required.

Figure 31:
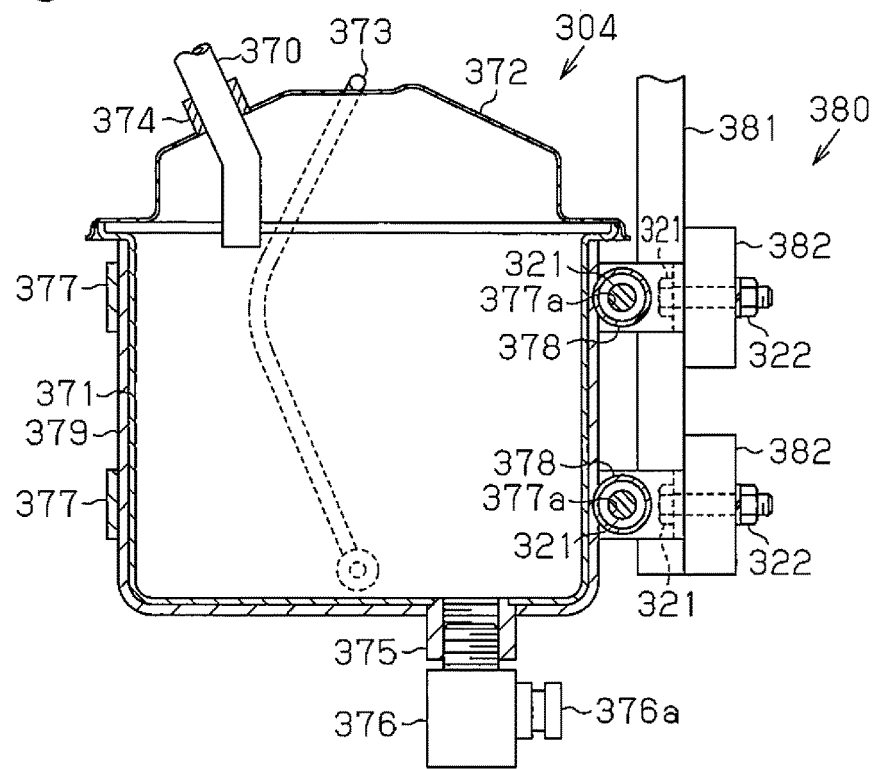
FIG. 31 is a cross-sectional view illustrating an additional tank according to a modification.

In the configuration of the fifth embodiment, as shown in FIG. 31, the main container 371 of the additional tank 304 may be covered with a heat insulating material 379. In this case, since the additional tank 304 is covered with the heat insulating material, the water in the collected liquid is prevented from being frozen, and discharge of the collected liquid is prevented from being hindered due to freezing.

Figure 32:
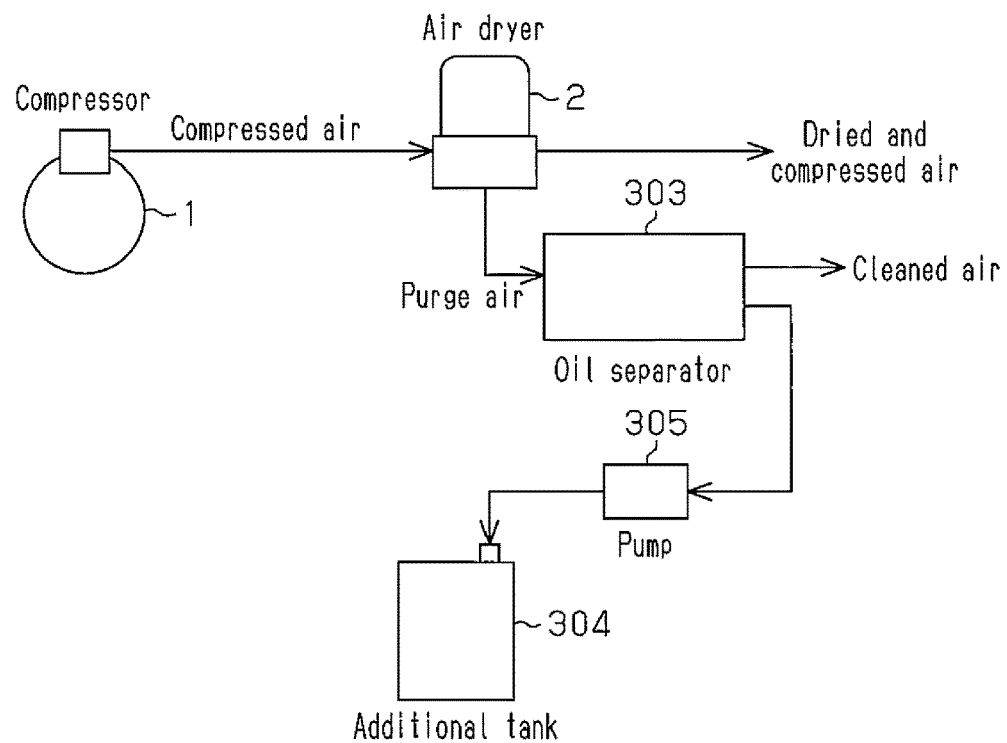
FIG. 32 is a block diagram illustrating an installation position of an oil separator according to a modification in an air system.

In the configuration of the fifth embodiment, as shown in FIG. 32, a pump 305 may be provided between the oil separator main body 303 and the additional tank 304 to forcibly convey the collected liquid from the housing 311 to the additional tank 304. In this case, since the collected liquid is conveyed from the collected liquid storage portion 345 of the housing 311 to the additional tank 304 by the pump 305, the collected liquid is reliably conveyed from the housing 311 to the additional tank 304.

In the fifth embodiment, the additional tank 304 is a cylindrical container, but the shape of the additional tank 304 can be changed as required in accordance with the installation space and the capacity. The shape of the mounting members 377 may also be changed as required.

In the fifth embodiment, the oil separator main body 303 is provided in the exhaust system of the air dryer 2, which is downstream of the compressor 1 of the air system. However, the oil separator main body 303 may be provided downstream of the compressor 1 of the air system and upstream of the air dryer 2. In this case, oil is separated from the air containing lubricant in the compressor 1, and cleaned air is supplied to the air dryer 2. Thus, the desiccant in the air dryer 2 is prevented from being deteriorated due to the oil.

The oil separators 3, 103, 203 according to the first to fourth embodiments may be provided with the additional tank 304.

The invention claimed is:

1. A system comprising:
    a compressor that supplies compressed air;
    an air dryer that is connected to the compressor, and dries the compressed air supplied from the compressor and supplies dried compressed air, the air dryer comprising a supplying line that supplies the dried compressed air and an exhaust line that discharges purge air containing oil and water; and an oil separator connected to the exhaust line, comprising:
   a housing including an inlet for introducing the purge air from the air dryer and an outlet for discharging cleaned air;
   an expansion chamber and at least one additional expansion chamber provided in the housing, the expansion chamber being arranged between the at least one additional expansion chamber and a lower part of the housing;
   at least one through hole formed in at least one partition between the expansion chamber and the at least one additional expansion chamber, the at least one through hole being configured to permit the purge air introduced through the inlet to flow vertically downward through the expansion chamber and the at least one additional expansion chamber; and
   a heating device, wherein
     the oil separator is configured to introduce the purge air into the housing through the inlet, and to separate and recover the oil and the water from the introduced purge air, and
     a transverse cross-sectional area of the expansion chamber is greater than the opening area of the inlet,
     the oil separator further comprises a collected liquid storage portion at the lower part of the housing, which is lower than the inlet and the outlet, wherein
       the collected liquid storage portion stores the collected liquid containing separated oil and water, and
       the heating device is configured to heat the collected liquid stored in the collected liquid storage portion such that the water in the collected liquid is evaporated.

2. The system according to claim 1, wherein
an accommodation portion for accommodating the heating device is provided at the lower part of the housing, and
the heating device is configured to heat the housing.

3. The system according to claim 1, wherein an insertion hole for inserting the heating device into the housing is provided at the lower part of the housing, and
the heating device is configured to heat a collected liquid stored at a lower part of the expansion chamber.

4. The system according to claim 1, wherein
the expansion chamber includes an impingement plate,
the oil separator is configured to cause the introduced purge air to strike the impingement plate so that oil is separated and recovered from the introduced purge air, and
the collected liquid storage portion is configured to be detachable with respect to the housing.

5. The system according to claim 1, wherein
during loading operation, the air dryer passes the compressed air through a desiccant to remove oil and water from the compressed air, and discharges the dried compressed air via the supplying line,
during unloading operation, the air dryer passes the dried compressed air supplied via the supplying line through the desiccant to regenerate the desiccant, and discharges the purge air including the removed oil and water via the exhaust line, and
the oil separator, during the unloading operation, causes the purge air introduced through the inlet to strike the impingement member to separate oil from the introduced purge air, thereby recovering the oil.

6. A system comprising:
a compressor that supplies compressed air;
an air dryer that is connected to the compressor, and dries the compressed air supplied from the compressor and supplies dried compressed air, the air dryer comprising a supplying line that supplies the dried compressed air and an exhaust line that discharges purge air containing oil and water; and
an oil separator connected to the exhaust line, comprising:
   a lid including an inlet for introducing the purge air from the air dryer and an outlet for discharging cleaned air;
   a plurality of expansion chambers arranged next to one another in a vertical direction;
   a housing mountable to the lid;
   a collected liquid storage portion at a lower part of the housing lower than the inlet and the outlet;
   a mounting and dismounting mechanism for allowing the lid to be detachable with respect to the housing; and
   a heating device, wherein
     the oil separator is configured to cause the purge air to flow into the housing and strike an impingement member to separate oil and water from the purge air, thereby recovering liquid containing oil and water, and discharge cleaned air,
     at least one through hole, which permits the purge air introduced through the inlet to flow vertically downward, is formed in at least one partition between the expansion chambers,
     the collected liquid storage portion stores the collected liquid containing separated oil and water, and
     the heating device is configured to heat the collected liquid stored in the collected liquid storage portion such that the water in the collected liquid is evaporated.

7. The system according to claim 6, wherein the inlet and the outlet are provided on a horizontal surface of the lid.

8. The system according to claim 6, wherein the heating device is configured to heat the collected liquid stored in the collected liquid storage portion, wherein an insertion hole for inserting the heating device into the housing is formed at the lower part of the housing.

9. The system according to claim 6, wherein the heating device is configured to heat the collected liquid storage portion, wherein an accommodation portion for accommodating the heating device is provided at the lower part of the housing.

10. The system according to claim 6, wherein
during loading operation, the air dryer passes the compressed air through a desiccant to remove oil and water from the compressed air, and discharges the dried compressed air via the supplying line,
during unloading operation, the air dryer passes the dried compressed air supplied via the supplying line through the desiccant to regenerate the desiccant, and discharges the purge air including the removed oil and water via the exhaust line, and
the oil separator, during the unloading operation, causes the purge air introduced through the inlet to strike the impingement member to separate oil from the introduced purge air, thereby recovering the oil.

11. A system comprising:
a compressor that supplies compressed air;
an air dryer that is connected to the compressor, and dries the compressed air supplied from the compressor and supplies dried compressed air, the air dryer comprising a supplying line that supplies the dried compressed air and an exhaust line that discharges purge air containing oil and water; and an oil separator connected to the exhaust line, comprising:
- a housing including an inlet for introducing the purge air from the air dryer and an outlet for discharging cleaned air;
- an expansion chamber and at least one additional expansion chamber provided in the housing, the expansion chamber being arranged between the at least one additional expansion chamber and a lower part of the housing;
- at least one through hole formed in at least one partition between the expansion chamber and the at least one additional expansion chamber, the at least one through hole being configured to permit the purge air introduced through the inlet to flow vertically downward through the expansion chamber and the at least one additional expansion chamber; and
- a heating device,
- wherein the oil separator is configured to cause the purge air to flow into the housing to separate oil and water from the purge air, thereby recovering a liquid that contains oil and water, and discharge cleaned air,
- the oil separator further comprises a collected liquid storage portion at the lower part of the housing, which is lower than the inlet and the outlet,
- the collected liquid storage portion stores a collected liquid containing separated oil, and
- the heating device is configured to heat the collected liquid stored in the collected liquid storage portion such that the water in the collected liquid is evaporated.

12. The system according to claim 11, wherein the heating device is provided on an outer circumference of the housing.

13. The system according to claim 11, wherein the heating device is provided inside the housing.

14. The system according to claim 11, wherein
the heating device draws in compressed air from the compressor, and heats the housing utilizing the compressed air that has been drawn in; and
the compressed air of the compressor is supplied to the air dryer via the heating device.

15. The system according to claim 11, wherein the heating device draws in exhaust gas of an internal combustion engine to the heating device, and heats the housing utilizing the exhaust gas that has been drawn in.

16. The system according to claim 11, wherein
the expansion chamber includes an impingement member,
the oil separator is configured to cause the purge air that has flowed into the housing to strike the impingement member to separate oil from the purge air, thereby recovering a liquid that contains oil, and
the heating device includes an electric heater for heating the housing.

17. The system according to claim 11, wherein
during loading operation, the air dryer passes the compressed air through a desiccant to remove oil and water from the compressed air, and discharges the dried compressed air via the supplying line,
during unloading operation, the air dryer passes the dried compressed air supplied via the supplying line through the desiccant to regenerate the desiccant, and discharges the purge air including the removed oil and water via the exhaust line, and
the oil separator, during the unloading operation, causes the purge air introduced through the inlet to strike the impingement member to separate oil from the introduced purge air, thereby recovering the oil.

* * * * *